United States Patent
Mikami et al.

(10) Patent No.: US 10,745,567 B2
(45) Date of Patent: Aug. 18, 2020

(54) POWDERED PAINT AND ELECTROSTATIC POWDER COATING METHOD

(71) Applicant: FUJI XEROX CO., LTD., Tokyo (JP)

(72) Inventors: Masato Mikami, Kanagawa (JP);
Susumu Yoshino, Kanagawa (JP);
Takeshi Agata, Kanagawa (JP);
Hiroshi Saegusa, Kanagawa (JP);
Minquan Tian, Kanagawa (JP);
Makoto Furuki, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 126 days.

(21) Appl. No.: 15/641,621

(22) Filed: Jul. 5, 2017

(65) Prior Publication Data

US 2018/0273770 A1    Sep. 27, 2018

(30) Foreign Application Priority Data

Mar. 21, 2017  (JP) ................................ 2017-054799
Mar. 24, 2017  (JP) ................................ 2017-058955

(51) Int. Cl.

| C09D 5/03 | (2006.01) |
|---|---|
| B05B 5/00 | (2006.01) |
| C09D 167/02 | (2006.01) |
| C08K 3/36 | (2006.01) |
| C08K 3/22 | (2006.01) |
| C08K 7/00 | (2006.01) |

(52) U.S. Cl.
CPC .............. C09D 5/034 (2013.01); B05B 5/001 (2013.01); C09D 5/031 (2013.01); C09D 167/02 (2013.01); *C08K 3/36* (2013.01); *C08K 7/00* (2013.01); *C08K 2003/2241* (2013.01); *C08K 2003/2296* (2013.01); *C08K 2201/003* (2013.01); *C08K 2201/016* (2013.01)

(58) Field of Classification Search
CPC .............................. C09D 5/034; C09D 167/02
See application file for complete search history.

(56) References Cited

U.S. PATENT DOCUMENTS

| 6,040,350 | A * | 3/2000 | Fukui .................... B29C 44/18 |
|---|---|---|---|
| | | | 521/135 |
| 2006/0046174 | A1* | 3/2006 | Ohki .................... G03G 9/0804 |
| | | | 430/108.4 |
| 2015/0072281 | A1* | 3/2015 | Okada ................ G03G 9/09392 |
| | | | 430/105 |
| 2015/0353762 | A1 | 12/2015 | Matsumura et al. |
| 2015/0361297 | A1 | 12/2015 | Mikami et al. |
| 2015/0368477 | A1* | 12/2015 | Yoshino ................. C09D 5/031 |
| | | | 428/335 |
| 2016/0024347 | A1 | 1/2016 | Agata et al. |
| 2016/0075885 | A1 | 3/2016 | Ishizuka et al. |

FOREIGN PATENT DOCUMENTS

| JP | H08-253711 | A | 10/1996 |
|---|---|---|---|
| JP | H09-208855 | A | 8/1997 |
| JP | H11-100534 | A | 4/1999 |
| JP | H11-106683 | A | 4/1999 |
| JP | 3256913 | B2 * | 2/2002 |
| JP | 2003-211083 | A | 7/2003 |
| JP | 2015-232063 | A | 12/2015 |
| JP | 2016-000794 | A | 1/2016 |
| JP | 2016-006143 | A | 1/2016 |
| JP | 2016-30785 | A | 3/2016 |
| JP | 2016-056332 | A | 4/2016 |

OTHER PUBLICATIONS

JP-3256913-B2—English translation (Year: 2002).*

* cited by examiner

Primary Examiner — Stefanie J Cohen
(74) Attorney, Agent, or Firm — Oliff PLC

(57) ABSTRACT

Provided is a powdered paint containing powdered particles and inorganic particles, the powdered paint having an attenuation factor $AF_{[30-300]}$ (%) represented by an absolute value of $[(Q30-Q300)/Q30]$ is 30% or more and 60% or less, wherein Q30 represents electric charge amount in an adherent layer including 100 g/m² of the powdered paint adhered to a substrate 30 seconds after forming the adherent layer, and Q300 represents electric charge amount in the adherent layer 300 seconds after forming the adherent layer.

18 Claims, No Drawings

POWDERED PAINT AND ELECTROSTATIC POWDER COATING METHOD

CROSS-REFERENCE TO RELATED APPLICATIONS

This application is based on and claims priorities under 35 USC 119 from Japanese Patent Application No. 2017-0054799 filed on Mar. 21, 2017 and Japanese Patent Application No. 2017-058955 filed on Mar. 24, 2017.

TECHNICAL FIELD

The present invention relates to a powdered paint and an electrostatic powder coating method.

BACKGROUND ART

In recent years, a powder coating technology using a powdered paint is attracting the attention in global environment protection in view of the facts that the emission amount of volatile organic compounds (VOC) in a coating step is small and after coating, a powdered paint that was not adhered to an object to be coated can be recovered and reused. For this reason, various powdered paints are investigated.

SUMMARY

An object of the present invention is to provide a powdered paint capable of suppressing a generation of coating film roughness.

According to an aspect of the invention, there is provided a powdered paint containing powdered particles and inorganic particles, the powdered paint having an attenuation factor $AF_{[30\text{-}300]}$ (%) represented by an absolute value of $[(Q30-Q300)/Q30]$ is 30% or more and 60% or less, wherein Q30 represents electric charge amount in an adherent layer including 100 g/m² of the powdered paint adhered to a substrate 30 seconds after forming the adherent layer, and Q300 represents electric charge amount in the adherent layer 300 seconds after forming the adherent layer.

DETAILED DESCRIPTION

The preferred embodiment of the present invention is described in detail below.

Powdered Paint

A powdered paint of the present embodiment contains powdered particles and inorganic particles. When electric charge amount after 30 seconds from the completion of adhesion is Q30 and electric charge amount after 300 seconds from the completion of adhesion is Q300 in adhering an adherent layer of an adhering amount of 100 g/m² to a substrate, an attenuation factor $AF_{[30\text{-}300]}$ (%) represented by an absolute value of $[(Q30-Q300)/Q30]$ is 30% or more and 60% or less.

The powdered paint used in powder coating is produced by further externally adding inorganic particles to powdered particles containing a binder resin, a hardener for hardening the binder resin used as necessary, a colorant such as a pigment, and other components such as a flame retardant and a leveling agent. The powdered paint thus produced is coated on an object to be coated, by a method such as an electrostatic powder coating method and then heated, thereby a coating film is formed. The electrostatic powder coating method is, for example, a method of discharging (jetting) a powdered paint charged by contact charging, corona discharge or the like using a spray gun or the like and electrostatically adhering the powdered paint to a grounded object to be coated.

However, conventionally, when a coating film was formed on an object to be coated using a powdered paint, coating film roughness caused by pocks was sometimes generated.

On the other hand, according to the powdered paint of the present embodiment, the generation of coating film roughness caused by pocks can be suppressed in the coating film formed by adhering the powdered paint to an object to be coated, followed by heating.

The reason for this is assumed to be as follows.

It is assumed that the coating film roughness is caused by that in jetting a powdered paint onto an object to be coated and electrostatically adhering to form an adherent layer, electric charge accumulates in the adherent layer and electrostatic repulsion is generated. The electrostatic repulsion means that electric charge accumulates in an adherent layer, electric charge having polarity reverse to that of an object to be coated is induced, and as a result, repulsion force causes among powdered particles in the adherent layer. It is considered that by the electrostatic repulsion, adhered powdered particles pop out from the adherent layer, and circular or crater-shaped depressions (pocks) are generated, leading to coating film roughness.

In the powdered paint of the present embodiment, an attenuation factor $AF_{[30\text{-}300]}$ of electric charge amount in a period of from 30 seconds to 300 seconds after the completion of adhesion in an adherent layer adhered (coated) in a specific adhering amount onto a substrate is 30% or more and 60% or less. The powdered paint having the attenuation factor $AF_{[30\text{-}300]}$ of 30% or more indicates that the powdered paint causes a leakage of electric charge easily in jetting the powdered paint to an object to be coated or after electrically adhering the powdered paint to the object. It is assumed that this reduces accumulation of electric charge in the adherent layer and suppresses the generation of electrostatic repulsion, and as a result, the phenomenon that powdered particles pop out from the adherent layer and depressions (pocks) are generated, leading to coating film roughness, is suppressed.

The powdered paint having the attenuation factor $AF_{[30\text{-}300]}$ of 60% or less indicates that electric charge amount in the adherent layer is not excessively decreased even after the charge leakage (leakage of electric charge) was generated. By this, electric charge is not excessively decreased in the powdered paint during jetting (discharging) the powdered paint to an object to be coated, and electrostatic adhesion is obtained. As a result, for example, the phenomenon that the powdered paint is blown away by the influence of airflow or the like during jetting and is not adhered to the intended place on an object to be coated is suppressed. Furthermore, electric charge is not decreased even in the powdered paint electrostatically adhered to an object to be coated, and the phenomenon that the powdered paint is separated (peeled and dropped) from the adherent layer due to lack of electric charge is suppressed. It is assumed from those that the powdered paint has excellent film formability of a coating film.

When the powdered particles contained in the powdered paint has small particle diameter (for example, a volume average particle diameter is 10 μm or less), a coating film having further excellent smoothness can be formed, but on the other hand, a surface area as the whole powdered paint is increased as compared with the case that a particle diameter is larger. Therefore, the influence of accumulation of electric charge further increases, and coating film roughness caused by the pocks is easy to be generated. However, according to the present embodiment, the accumulation of electric charge in the adherent layer is reduced and the generation of coating film roughness caused by the pocks is suppressed, as described above.

When the thickness of the coating film to be formed on an object to be coated is increased, that is, an adhering amount is increased (for example, the adhering amount is 120 g/m² or more), electric charge is easy to be accumulated, and as a result, coating film roughness caused by the pocks is easy to be generated. However, according to the present embodiment, the accumulation of electric charge is reduced and the generation of coating film roughness caused by the pocks is suppressed, as described above.

The powdered paint of the present embodiment is described in detail below.

Attenuation Factor

Attenuation Factor $AF_{[30-300]}$ Over 30 to 300 Seconds after Completion of Adhesion The powdered paint of the present embodiment has the attenuation factor $AF_{[30-300]}$ (%) represented by an absolute value of $[(Q30-Q300)/Q30]$ is 30% or more and 60% or less, where Q30 represents the electric charge amount in an adherent layer 30 seconds after forming the adherent layer and Q300 represents the electric charge amount in the adherent layer 300 seconds after forming the adherent layer, the adherent layer including 100 g/m² of the powdered paint adhered to a substrate.

When the attenuation factor $AF_{[30-300]}$ is 30% or more, the phenomenon that the powdered particles pop out from the adherent layer and depressions (pocks) are generated, leading to coating film roughness in the coating film, is suppressed. On the other hand, when the attenuation factor $AF_{[30-300]}$ is 60% or less, the powdered paint has excellent film formability of a coating film.

The value of the attenuation factor $AF_{[30-300]}$ is 30% or more and 60% or less, preferably 30% or more and 55% or less, and more preferably 32% or more and 50% or less.

Attenuation Factor $AF_{[30-100]}$ Over 30 to 100 Seconds after Completion of Adhesion Furthermore, it is preferred in the present embodiment that an attenuation factor $AF_{[30-100]}$ (%) represented by an absolute value of $[(Q30-Q100)/Q30]$ is 5% or more and 20% or less, where Q30 represents electric charge amount in the adherent layer 30 seconds after forming the adherent layer and Q100 represents electric charge amount in the adherent layer 100 seconds after forming the adherent layer, the adherent layer including 100 g/m² of the powdered paint adhered to a substrate.

The powdered paint having the attenuation factor $AF_{[30-100]}$ of 5% or more means that charge leakage (leakage of electric charge) is easy to be promptly generated, in other words, indicates a powdered paint that is easy to promptly generate charge leakage (leakage of electric charge) in jetting to an object to be coated or after electrostatically adhering to an object to be coated. By this, even when the thickness of the coating film formed on an object to be formed is increased and the adhering amount is increased (for example, the adhering amount is 120 g/m² or more), the phenomenon that the powdered particles pop out from the adherent layer and depressions (pocks) is generated, leading to coating roughness in the coating film, is easy to be suppressed.

On the other hand, when the attenuation factor $AF_{[30-300]}$ is 20% or less, the electric charge amount is not rapidly decreased excessively, and the phenomenon that in the powdered paint during jetting (discharging) to an object to be coated, for example, the powdered paint is blown away by the influence of airflow or the like during jetting and is not adhered to the intended place on an object to be coated is easy to be suppressed. Furthermore, electric charge is not decreased even in the powdered paint electrostatically adhered to an object to be coated, and the phenomenon that the powdered paint is separated (peeled and dropped) from the adherent layer due to lack of electric charge is easy to be suppressed. By those, excellent film formability of a coating film is easy to be obtained.

The value of the attenuation factor $AF_{[30-100]}$ is preferably 5% or more and 20% or less, more preferably 7% or more and 18% or less, and still more preferably 9% or more and 15% or less.

Attenuation Factor $AF_{[30-200]}$ Over 30 to 200 Seconds after Completion of Adhesion Furthermore, it is preferred in the present embodiment that an attenuation factor $AF_{[30-200]}$ (%) represented by an absolute value of $[(Q30-Q200)/Q30]$ is 15% or more and 30% or more, where Q30 represents electric charge amount in the adherent layer 30 seconds after forming the adherent layer and Q200 represents electric charge amount in the adherent layer 200 seconds after forming the adherent layer, the adherent layer including 100 g/m² of the powdered paint adhered to a substrate.

When the attenuation factor $AF_{[30-200]}$ (%) is 15% or more, the phenomenon that the powdered particles pop out from the adherent layer and depressions (pocks) is generated, leading to coating film roughness in the coating film, is suppressed. On the other hand, when the attenuation factor $AF_{[30-200]}$ is 30% or less, excellent film formability of a coating film is easy to be obtained.

The value of the attenuation factor $AF_{[30-200]}$ is preferably 15% or more and 30% or less, more preferably 17% or more and 28% or less, and still more preferably 20% or more and 25% or less.

Measurement Method of Electric Charge Amount in Adherent Layer

The electric charge amount Q30 and the electric charge amount Q300 are measured by the following method.

An adherent layer is formed using Corona Gun XR4-110C manufactured by Asahi Sunac Corporation by the following method. A mirror finished aluminum plate (30 cm×30 cm) is prepared as a substrate, and a powdered paint is applied to the substrate from the front in a distance of 20 cm (a distance between the substrate and a outlet port of the corona gun) by sliding the corona gun vertically and horizontally and electrostatically adhered to the substrate. Thus, an adherent layer of an adhering amount of 100 g/m² is obtained. In this case, when the adherent layer has the adhering amount of 98 g/m² or more and 102 g/m² or less, it is considered to be 100 g/m². Applied voltage of the corona gun is 100 kV, input air pressure is 0.55 MPa, and discharge amount is 100 g/min.

Next, electric charge amount is measured. The electric charge amount of the adherent layer is measured using Faraday gauge, and is measured using a suction type portable electrification measuring instrument (electric charge amount measuring instrument EA02 System, manufactured by U-TEC). Powdered particles contained in the adherent layer are directly taken in a filter in Faraday gauge by a suction nozzle from the adherent layer after 30 seconds from the completion of adhesion and the adherent layer after 300 seconds from the completion of adhesion, electric charge amount and mass are measured, and the electric charge amount per unit mass of the powdered particles is obtained. The electric charge amount per unit mass of the powdered particles is measured at optional 10 places of the adherent layer, and its arithmetic mean value is used as the electric charge amount of the adherent layer.

The electric charge amount Q100 after 100 seconds from the completion of adhesion and the electric charge amount Q200 after 200 seconds from the completion of adhesion are measured according to the above method, except that powdered particles are taken in a filter in Faraday gauge from the adherent layer after 100 seconds or 200 seconds from the completion of adhesion.

Control Method of Attenuation Factor

The attenuation factor $AF_{[30-300]}$, attenuation factor $AF_{[30-200]}$, attenuation factor $AF_{[30-100]}$ are an index of easiness of charge leakage (leakage of electric charge) in a powdered paint. Each attenuation factor can be controlled by, for example, a composition of powdered particles, a production method of powdered particles, a composition of inorganic particles and a surface treatment.

For example, as one example, each attenuation factor is easy to be decreased as inorganic particles having lower degree of a hydrophobization treatment (more preferably inorganic particles that are not subjected to a hydrophobization treatment) are used as inorganic particles that are externally added to the surface of powdered particles.

It is preferred that a dielectric loss factor of the powdered paint is within the following range from the standpoint that each attenuation factor is easy to control to the above range.

Dielectric Loss Factor

The powdered paint of the present embodiment has a dielectric loss factor of preferably $40 \times 10^{-3}$ or more and $150 \times 10^{-3}$ or less, more preferably $50 \times 10^{-3}$ or more and $100 \times 10^{-3}$ or less, and still more preferably $50 \times 10^{-3}$ or more and $80 \times 10^{-3}$ or less.

The dielectric loss factor of the powdered paint is measured by the following method.

A powdered paint (5 g) is molded into a pellet shape, the pellet is set between electrodes (SE-71 Model, electrode for solid, manufactured by Ando Electric Co., Ltd.) at 20° C. under a relative humidity of 60%, and a dielectric loss factor is measured at 5V and a frequency of 100 kHz by LCR meter (4274 Model A, manufactured by Yokogawa•Hewlett-Packard).

The dielectric loss factor is obtained by the following formula (1).

$$(14.39/(W \times D^2)) \times G_x \times T_x \times 10^{12} \qquad (1)$$

wherein $W = 2\pi f$ (f: measurement frequency 100 kHz), D: electrode diameter (cm), $G_x$: conductivity (S), $T_x$: sample thickness (cm)

The dielectric loss factor of the powdered paint can be controlled by, for example, a composition of powdered particles, a production method of powdered particles, a composition of inorganic particles and a surface treatment. For example, the dielectric loss factor is easy to be decreased as inorganic particles having lower degree of a hydrophobization treatment (more preferably inorganic particles that are not subjected to a hydrophobization treatment) are used as inorganic particles that are externally added to the surface of powdered particles.

Inorganic Particles

The powdered paint of the present embodiment contains powdered particles and inorganic particles.

The inorganic particles are externally added to the surface of the powdered particles.

The external addition method is not particularly limited, and the conventional external addition method in the field of a powdered paint can be used.

Preferred examples of the inorganic particles include particles containing $SiO_2$, $TiO_2$, $Al_2O_3$, CuO, ZnO, $SnO_2$, $CeO_2$, $Fe_2O_3$, MgO, BaO, CaO, $K_2O$, $Na_2O$, $ZrO_2$, CaO. $SiO_2$, $K_2O.(TiO_2)_n$, $Al_2O_3.2SiO_2$, $CaCO_3$, $MgCO_3$, $BaSO_4$ or $MgSO_4$.

The inorganic particles used in the present embodiment are preferably Titania particles and zinc oxide particles, and more preferably Titania particles, from the standpoint of suppression of coating film roughness in a coating film obtained by the powdered paint.

Rutile type and anatase type are mainly known as a crystal form of the titania particles, and any of those crystal forms can be used in the present embodiment. However, rutile type is preferred from the standpoint of light resistance of a coating film.

In the present embodiment, the inorganic particles may be used in one kind alone, and may be used as mixtures of two or more kinds.

Content

The content of the inorganic particles is preferably 0.1 mass % or more and 3 mass % or less, and more preferably 0.3 mass % or more and 1.5 mass % or less, based on the total mass of the powdered particles from the standpoint of suppression of coating film roughness in a coating film obtained.

Particle Diameter

Volume average particle diameter (average primary particle diameter) of the inorganic particles is preferably 10 nm or more and 100 nm or less, more preferably 15 nm or more and 90 nm or less, and still more preferably 20 nm or more and 80 nm or less.

When the volume average particle diameter of the inorganic particles is within the above range, adhesiveness to the powdered particles is excellent, and coating film roughness in a coating film obtained by the powdered paint is suppressed.

The volume average particle diameter of the inorganic particles is measured by the following method.

A powdered paint to be measured is observed with a scanning electron microscope (SEM). Respective equivalent circle diameters of 100 inorganic particles to be measured are obtained by image analysis, and an equivalent circle diameter of 50% accumulation in volume basis form a small diameter side in the distribution of the volume basis is used as a volume average particle diameter.

The image analysis for obtaining equivalent circle diameter of 100 inorganic particles to be measured is that a two-dimensional image of 10,000 magnifications is taken using an analyzer (ERA-8900, manufactured by Elionix Inc.), a projected area is obtained under the conditions of 0.010000 μm/pixel using an image analysis software Win ROOF (manufactured by Mitani Corporation), and an equivalent circle diameter is obtained by the formula: equivalent circle diameter = $2 \times (\text{projected area}/\pi)^{1/2}$.

It is necessary to distinguish each external additive in order to measure volume average particle diameters of a plural kind of external additives. Specifically, each kind of external additives is distinguished by performing element mapping by EM-EDX (scanning electron microscope equipped with energy dispersive X-ray analyzer) and associating an element originated from each kind of external additives to the corresponding external additive.

Aspect Ratio

The aspect ratio of the inorganic particles is preferably 1 or more and 10 or less.

When the aspect ratio is within the above range, the inorganic particles are difficult to separate from the powdered particles, and coating film roughness in a coating film obtained is further suppressed.

The aspect ratio is preferably 1 or more and less than 2, and more preferably 1 or more and 1.5 or less, from the standpoint of further suppression of coating film roughness of the powdered particles.

Furthermore, the aspect ratio is preferably 2 or more and 5 or less, and more preferably 2.5 or more and 4.5 or less, from the standpoint of prevention of separation of the inorganic particles from the powdered particles.

The aspect ratio is measured as a ratio (L/S) of a long diameter (L) to a short diameter (S) by conducting particle shape analysis of an image of scanning electron microscope (SEM, product name: SU8010, manufactured by Hitachi High-Technologies Corporation) to the inorganic particles on the powdered particles by an image analysis software (manufactured by Mitani Corporation, product name: Win ROOF) attached thereto.

Hydrophobization Treatment

The inorganic particles used in the present embodiment are that the surface thereof may be previously subjected to a hydrophobization treatment. However, inorganic particles having low degree of a hydrophobization treatment (more preferably inorganic particles that are not subjected to a hydrophobization treatment) are preferably used from the standpoint of easily attenuating electric charges in the powdered paint, thereby easily controlling the above-described attenuation factor $AF_{[30-300]}$, attenuation factor $AF_{[30-200]}$ and attenuation factor $AF_{[30-100]}$ to the above ranges. In other words, it is preferred that the inorganic particles are not excessively subjected tp a hydrophobization treatment from the standpoint of suppressing coating film roughness in the coating film obtained by the powdered paint.

The hydrophobization treatment can be conducted by, for example, dipping the inorganic oxide particles in a hydrophobic treatment agent. The hydrophobic treatment agent is not particularly limited, and examples thereof include a silane coupling agent, a silicone oil, a titanate type coupling agent, and an aluminum type coupling agent. Those may be used in one kind alone or as mixtures of two or more kinds.

Volume Resistivity

The inorganic particles used in the present embodiment have volume resistivity of preferably $1 \times 10^5$ Ω·cm or more and $1 \times 10^{13}$ Ω·cm or less, more preferably $1 \times 10^6$ Ω·cm or more and $1 \times 10^{12}$ Ω·cm or less, and still more preferably $1 \times 10^7$ Ω·cm or more and $1 \times 10^{11}$ Ω·cm or less.

When the volume resistivity is within the above range, coating film roughness in the coating film obtained by the powdered paint is easy to be suppressed, and this is preferred.

The volume resistivity of the inorganic particles is measured by the following method.

The inorganic particles are separated from the powdered particles. The separated inorganic particles to be measured are placed on a surface of a circular jig having provided thereon an electrode plate of 20 cm² in a thickness of about 1 mm or more and 3 mm or less to form an inorganic particle layer. The same electrode plate of 20 cm² as above is placed on the inorganic particle layer to sandwich the inorganic particle layer with those electrode plates. A load of 4 kg is applied to the electrode plate arranged on the inorganic particle layer in order to remove spaces among the inorganic particles, and a thickness (cm) of the inorganic particle layer is measured. Both electrodes upper and lower the inorganic particle layer are connected to an electrometer and a high pressure electric power source generator. High voltage is applied to both electrodes, and a current value (A) flown at that time is read, and volume resistivity (Ω·cm) of the inorganic particles is calculated. The measurement is conducted under the condition of temperature: 20° C. and relative humidity: 50%. The calculation formula of the volume resistivity (Ω·cm) of the inorganic particles is the following formula.

In the formula, ρ is volume resistivity (Ω·cm) of the inorganic particles, E is applied voltage (V), I is a current value (A), $I_0$ is a current value (A) at applied voltage of 0V, and L is a thickness (cm) of the inorganic particle layer. In the present embodiment, volume resistivity at the applied voltage of 1,000V is used.

$$\rho = E \times 20/(I-I_0)/L \qquad \text{Formula}$$

Content of Inorganic Particles

The content of the inorganic particles is preferably 0.1 mass % or more and 3 mass % or less, and more preferably 0.3 mass % or more and 1.5 mass % or less, based on the total mass of the powdered particles from the standpoint of further suppression of coating film roughness in the coating film obtained.

Powdered Particles

The powdered particles contained in the powdered paint preferably contain a thermosetting resin and a thermosetting agent. The powdered particles may contain a colorant and other additives as necessary.

Thermosetting Resin

The thermosetting resin is a resin having a thermosetting reactive group. Examples of the thermosetting resin include various kinds of resins conventionally used as powdered particles of a powdered paint.

The thermosetting resin is preferably a water-insoluble (hydrophobic) resin. When a water-insoluble (hydrophobic) resin is used as the thermosetting resin, environmental dependency of charging characteristics of the powdered paint (powdered particles) is reduced. Furthermore, when the powdered particles are prepared by an agglomerating and coalescing method, the thermosetting resin is preferably a water-insoluble (hydrophobic) resin from the standpoint of realization of emulsifying dispersion in an aqueous medium. The term "water-insoluble (hydrophobic)" used herein means that the amount of a target substance dissolved is less than 5 parts by mass per 100 parts by mass of water at 25° C.

Examples of the thermosetting resin include at least one selected from the group consisting of a thermosetting polyester resin, a thermosetting (meth)acryl resin, a thermosetting fluorine type resin (for example, a fluoroethylene-vinyl ether (FEVE) copolymer resin), a thermosetting polyethylene resin, a thermosetting epoxy resin and a thermosetting epoxy-polyester resin. Of those thermosetting resins, a thermosetting polyester resin is preferred from the standpoints of easy control of triboelectric series during coating, strength of a coating film and beautiful finishing.

Examples of the thermosetting reactive group contained in the thermosetting polyester resin include an epoxy group, a carboxyl group, a hydroxyl group, an amide group, an amino group, an acid anhydride group and a blocked isocyanate group. A carboxyl group and a hydroxyl group are preferred from the standpoint of easy synthesis.

Thermosetting Polyester Resin

The thermosetting polyester resin is a polyester resin having a thermohardening reactive group. Examples of the thermosetting reactive group contained in the thermosetting polyester resin include an epoxy group, a carboxyl group, a hydroxyl group, an amide group, an amino group, an acid anhydride group and a blocked isocyanate group. A carboxyl group and a hydroxyl group are preferred from the standpoint of easy synthesis.

The thermosetting polyester resin is a polycondensate obtained by polycondensing, for example, at least a polybasic acid and a polyhydric alcohol.

Incorporation of the thermosetting reactive group in the thermosetting polyester resin is conducted by adjusting the amounts of a polybasic acid and a polyhydric alcohol used in synthesizing the polyester resin. By this adjustment, a thermosetting polyester resin having at least one of a carboxyl group and a hydroxyl group as a thermosetting reactive group is obtained.

Furthermore, the thermosetting polyester resin may be obtained by synthesizing a polyester resin and then incorporating a thermosetting reactive group therein.

Examples of the polybasic acid include terephthalic acid, isophthalic acid, phthalic acid, methylterephthalic acid, trimellitic acid, pyromellitic acid and anhydrides of those acids; succinic acid, adipic acid, azelaic acid, sebacic acid and anhydrides of those acids; maleic acid, itaconic acid and anhydrides of those acids; fumaric acid, tetrahydrophthalic acid, methyltetrahydrophthalic acid, hexahydrophthalic acid, methylhexahydrophthalic acid and anhydrides of those acids; cyclohexanedicarboxylic acid and 2,6-naphthalenedicarboxylic acid.

Examples of the polyhydric alcohol include ethylene glycol, diethylene glycol, propylene glycol, dipropylene glycol, 1,3-butanediol, 1,4-butanediol, 1,5-pentanediol, 1,6-hexanediol, neopentyl glycol, triethylene glycol, bis-(hydroxyethyl)terephthalate, cyclohexane dimethanol, octanediol, diethyl propanediol, butyl ethyl propanediol, 2-methyl-1,3-propanediol, 2,2,4-trimethyl pentanediol, hydrogenated bisphenol A, an ethylene oxide adduct of hydrogenated bisphenol A, a propylene oxide adduct of hydrogenated bisphenol A, trimethylolethane, trimethylolpropane, glycerin, pentaerythritol, trishydroxyethyl isocyanurate and hydroxypivalyl hydroxypivalate.

The thermosetting polyester resin is that a monomer other than a polybasic acid and a polyhydric alcohol may be polycondensed.

Examples of the other monomer include a compound having both a carboxyl group and a hydroxyl group in one molecule (for example, dimethanolpropionic acid and hydroxypivalate), a monoepoxy compound (for example, glycidyl ester of branched aliphatic carboxylic acid, such as "Cardura E10 (manufactured by Shell)), various monohydric alcohols (for example, methanol, propanol, butanol and benzyl alcohol), various monobasic acid (for example, benzoic acid and p-tert-butylbenzoic acid) and various fatty acids (for example, castor oil fatty acid, coconut oil fatty acid and soybean oil fatty acid).

The structure of the thermosetting polyester resin may be a branched structure and may be a linear structure.

The thermosetting polyester resin is preferably a polyester resin having the total of an acid value and a hydroxyl value of 10 mgKOH/g or more and a number average molecular weight of 1,000 or more and 100,000 or less.

When the total of an acid value and a hydroxyl value is within the above range, smoothness and mechanical properties of the coating film are easy to be improved. When the number average molecular weight is within the above range, smoothness and mechanical properties of the coating film are improved, and additionally storage stability of the powdered paint is easy to be improved.

The measurement of the acid value and hydroxyl value of the thermosetting polyester resin is according to JIS K-0070-1992. The measurement of the number average molecular weight of the thermosetting polyester resin is the same as the measurement of a number average molecular weight of a thermosetting (meth)acryl resin described hereinafter.

Thermosetting (Meth)Acryl Resin

The thermosetting (meth)acryl resin is a (meth)acryl resin having a thermosetting reactive group. For incorporation of a thermosetting reactive group in the thermosetting (meth) acryl resin, a vinyl monomer having a thermosetting reactive group may be preferably used. The vinyl monomer having a thermosetting reactive group may be a (meth)acryl monomer (monomer having a (meth)acryloyl group) and may be a vinyl monomer other than the (meth)acryl monomer.

Examples of the thermosetting reactive group of the thermosetting (meth)acryl resin include an epoxy group, a carboxyl group, a hydroxyl group, an amide group, an amino group, an acid anhydride group and a (blocked) isocyanate group. Of those, the thermosetting reactive group of the thermosetting (meth)acryl resin is preferably at least one selected from the group consisting of an epoxy group, a carboxyl group and a hydroxyl group from the standpoint of easy production of a (meth)acryl resin. Particularly, it is more preferred that at least one of the thermosetting reactive groups is an epoxy group from the standpoint of excellent storage stability of a powdered paint and excellent appearance of a coating film.

Examples of the vinyl monomer having an epoxy group as a hardening reactive group include various chain epoxy group-containing monomers (for example, glycidyl (meth) acrylate, β-methylglycidyl (meth)acrylate, glycidyl vinyl ether and allyl glycidyl ether), various (2-oxo-1,3-oxolane) group-containing vinyl monomers (for example, (2-oxo-1, 3-oxolane)methyl (meth)acrylate) and various alicyclic epoxy group-containing monomers (for example, 3,4-epoxycyclohexyl (meth)acrylate, 3,4-epoxycyclohexylmethyl (meth)acrylate and 3,4-epoxycyclohexylethyl (meth)acrylate).

Examples of the vinyl monomer having a carboxyl group as a hardening reactive group include various carboxyl group-containing monomers (for example, (meth)acrylic acid, crotonic acid, itaconic acid, maleic acid and fumaric acid), various monoesters of α,β-unsaturated dicarboxylic acid and a monohydric alcohol having 1 or more and 18 or less carbon atoms (for example, monomethyl fumarate, monoethyl fumarate, monobutyl fumarate, monoisobutyl fumarate, mono tert-butyl fumarate, monohexyl fumarate, monooctyl fumarate, mono 2-ethylhexyl fumarate, monomethyl maleate, monoethyl maleate, monobutyl maleate, monoisobutyl maleate, mono tert-butyl maleate, monohexyl maleate, monooctyl maleate and mono 2-ethylhexyl maleate), and monoalkyl itaconates (for example, monomethyl itaconate, monoethyl itaconate, monobutyl itaconate, monoisobutyl itaconate, monohexyl itaconate, monooctyl itaconate and mono 2-ethylhexyl itaconate).

Examples of the vinyl monomer having a hydroxyl group as a hardening reactive group include various hydroxyl group-containing (meth)acrylates (for example, 2-hydroxyethyl (meth)acrylate, 2-hydroxylpropyl (meth)acrylate, 3-hydroxypropyl (meth)acrylate, 2-hydroxybutyl (meth) acrylate, 3-hydroxybutyl (meth)acrylate, 4-hydroxybutyl (meth)acrylate, polyethylene glycol mono(meth)acrylate and polypropylene glycol mono(meth)acrylate), addition reaction products between the various hydroxyl group-containing (meth)acrylates and ε-caprolactone, various hydroxyl group containing vinyl ethers (for example, 2-hydroxyethylvinyl ether, 3-hydroxypropylvinyl ether, 2-hydroxypropylvinyl ether, 4-hydroxybutylvinyl ether, 3-hydroxybutylvinyl ether, 2-hydroxy-2-methylpropylvinyl ether, 5-hydroxypentylvinyl ether and 6-hydroxyhexylvinyl ether), addition reaction products between the various hydroxyl group-containing vinyl ethers and ε-caprolactone, various hydroxyl group-containing allyl ethers (for example, 2-hydroxyethyl (meth)allyl ether, 3-hydroxypropyl (meth)allyl ether, 2-hydroxypropyl (meth)allyl ether, 4-hydroxybutyl (meth)allyl ether, 3-hydroxybutyl (meth)allyl ether, 2-hydroxy-2-methylpropyl (meth)allyl ether, 5-hydroxypentyl (meth)allyl ether and 6-hydroxyhexyl (meth)allyl ether), and addition reaction products between the various hydroxyl group-containing allyl ethers and ε-caprolactone.

The thermosetting (meth)acryl resin is that other than (meth)acryl monomer, other vinyl monomer that does not have a thermosetting reactive group may be copolymerized.

Examples of the other vinyl monomer include various α-olefins (for example, ethylene, propylene and butene-1), various halogenated olefins excluding fluoroolefin (for example, vinyl chloride and vinylidene chloride), various aromatic vinyl monomers (for example, styrene, α-methylstyrene and vinyltoluene), various diesters between unsaturated dicarboxylic acid and monohydric alcohol having 1 or more and 18 or less carbon atoms (for example, dimethyl fumarate, diethyl fumarate, dibutyl fumarate, dioctyl fumarate, dimethyl maleate, diethyl maleate, dibutyl maleate, dioctyl maleate, dimethyl itaconate, diethyl itaconate, dibutyl itaconate and dioctyl itaconate), various acid anhydride group-containing monomers (for example, maleic anhydride, itaconic anhydride, citraconic anhydride, (meth) acrylic anhydride and tetrahydrophthalic anhydride), various phosphate group-containing monomers (for example, diethyl-2-(meth)acryloyloxyethyl phosphate, dibutyl-2-(meth)acryloyloxybutyl phosphate, dioctyl-2-(meth)acryloyloxyethyl phosphate and diphenyl-2-(meth)acryloyloxyethyl phosphate), various hydrolyzable silyl group-containing monomers (for example, γ-(meth)acryloyloxypropyl trimethoxysilane, γ-(meth)acryloyloxypropyl triethoxysilane and γ-(meth)acryloyloxypropylmethyl dimethoxysilane), various aliphatic vinyl carbonates (for example, vinyl acetate, vinyl propionate, vinyl butyrate, vinyl isobutyrate, vinyl caproate, vinyl caprylate, vinyl caprate, vinyl laurate, vinyl branched aliphatic carboxylate having 9 or more and 11 or less carbon atoms, and vinyl stearate) and various vinyl esters of carboxylic acid having a cyclic structure (for example, vinyl cyclohexane carboxylate, vinyl methylcyclohexane carboxylate, vinyl benzoate and vinyl p-tert-butylbenzoate).

When a vinyl monomer other than (meth)acryl monomer is used as the vinyl monomer having a thermosetting reactive group in the thermosetting (meth)acryl resin, an acryl monomer that does not have a hardening reactive group is used.

Examples of the acryl monomer that does not have a hardening reactive group include alkyl (meth)acryles (for example, methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth) acrylate, n-hexyl (meth)acrylate, cyclohexyl (meth)acrylate, 2-ethylhexyl (meth)acrylate, n-octyl (meth)acrylate, isooctyl (meth)acrylate, 2-ethyloctyl (meth)acrylate, dodecyl (meth)acrylate, isodecyl (meth)acrylate, lauryl (meth)acrylate and stearyl (meth)acrylate), various aryl (meth)acrylates (for example, benzyl (meth)acrylate, phenyl (meth)acrylate and phenoxyethyl (meth)acrylate), various alkyl carbitol (meth)acrylates (for example, ethyl carbitol (meth)acrylate), other various (meth)acrylates (for example, isobornyl (meth) acrylate, dicyclopentanyl (meth)acrylate, dicyclopentenyl (meth)acrylate, dicyclopentenyloxyethyl (meth)acrylate and tetrahydrofurfuryl (meth)acrylate), various amino group-containing amide type unsaturated monomers (for example, N-dimethylaminoethyl (meth)acrylamide, N-diethylaminoethyl (meth)acrylamide, N-dimethylaminopropyl (meth) acrylamide and N-diethylaminopropyl (meth)acrylamide), various dialkyl aminoalkyl (meth)acrylate (for example, dimethylaminoethyl (meth)acrylate and diethylaminoethyl (meth)acrylate) and various amino group-containing monomers (for example, tert-butylaminoethyl (meth)acrylate, tert-butylaminopropyl (meth)acrylate, aziridinylethyl (meth)acrylate, pyrrolidinylethyl (meth)acrylate and piperidinylethyl (meth)acrylate).

The thermosetting (meth)acryl resin is preferably an acryl resin having a number average molecular weight of 1,000 or more and 20,000 or less (preferably 1,500 or more and 15,000 or less).

When the number average molecular weight is within the above range, smoothness and mechanical properties of the coating film are easy to be improved.

The weight average molecular weight and number average molecular weight of the thermosetting (meth)acryl resin are measured by gel permeation chromatography (GPC). The molecular weight measurement by GPC is conducted with THF solvent using GPC•HLC-8120 GPC manufactured by Tosoh Corporation as a measurement instrument. The weight average molecular weight and number average molecular weight are calculated using a molecular weight calibration curve prepared by a monodisperse polystyrene standard sample from the measurement results.

The thermosetting resin may be used alone or as mixture of two or more kinds.

The content of the thermosetting resin is preferably 20 mass % or more and 99 mass % or less, and more preferably 30 mass % or more and 95 mass % or less, based on the whole powdered particles.

As described hereinafter, when the powdered particles are core•shell type particles, when a thermosetting resin is used as a resin of the resin coated part, the content of the thermosetting resin means the content of the whole thermosetting resins of the core part and the resin coated part.

Thermosetting Agent

The thermosetting agent is selected depending on the kind of a thermosetting reactive group of the thermosetting resin.

The thermosetting agent used herein means a compound having a functional group reactive to a thermosetting reactive group that is a terminal group of the thermosetting resin.

When the thermosetting reactive group of the thermosetting resin is a carboxyl group, examples of the thermosetting agent include various epoxy resins (for example, polyglycidyl ether of bisphenol A), an epoxy group-containing acryl resin (for example, glycidyl group-containing acryl resin), polyglycidyl ethers of various polyhydric alcohols (for example, 1,6-hexanediol, trimethylolpropane and trimethylolethane), polyglycidyl esters of various polybasic carboxylic acids (for example, phthalic acid, terephthalic acid, isophthalic acid, hexahydrophthalic acid, methylhexahydrophthalic acid, trimellitic acid and pyromellitic acid), various alicyclic epoxy group-containing compounds (for example, bis(3,4-epoxycyclohexyl)methyl adipate), and hydroxyamides (for example, triglycidyl isocyanurate and β-hydroxyalkyl amide).

When the thermosetting reactive group of the thermosetting resin is a hydroxyl group, examples of the thermosetting agent include blocked polyisocyanate and aminoplast. Examples of the blocked polyisocyanate include organic diisocyanates such as various aliphatic diisocyanates (for example, hexamethylene diisocyanate and trimethylhexamethylene diisocyanate), various cyclic aliphatic diisocyanates (for example, xylylene diisocyanate and isophorone diisocyanate) and various aromatic diisocyanates (for example, tolylene diisocyanate and 4,4'-diphenylmethane diisocyanate); adducts between those organic diisocyantes and polyhydric alcohol, low molecular weight polyester resin (for example, polyester polyol) or water; polymers among those organic diisocyantes (polymers containing isocyanurate type polyisocyanate compound); products obtained by blocking various polyisocyanate compound such as isocyanate•biuret product with the conventional blocking agent; and self•blocked polyisocyanate compounds having a uretdione bond as a structural unit.

When the thermosetting reactive group of the thermosetting resin is an epoxy group, examples of the thermosetting agent include acids such as succinic acid, glutaric acid, adipic acid, pymellic acid, suberic acid, azelaic acid, sebacic acid, dodecanedioic acid, eicosandioic acid, maleic acid, citraconic acid, itaconic acid, glutaconic acid, phthalic acid, tetrahydrophthalic acid, hexahydrophthalic acid, cyclohexene-1,2-dicarboxylic acid, trimellitic acid and pyromellitic acid; anhydrides of those acids; and urethane-modified products of those acids. Of those, an aliphatic dibasic acid is preferred as the thermosetting agent from the standpoint of properties of a coating film and storage stability, and dodecanedioic acid is particularly preferred from the standpoint of properties of a coating film.

The thermosetting agent may be used alone or as mixtures of two or more kinds.

The content of the thermosetting agent is preferably 1 mass % or more and 30 mass % or less, and more preferably 3 mass % or more and 20 mass % or less, based on the thermosetting resin.

As described hereinafter, when the powdered particles are core•shell type particles, in the case of using the thermosetting resin as a resin of the resin coated part, the content of the thermosetting resin means the content based on the whole thermosetting resins of the core part and the resin coated part.

Colorant

Example of the colorant includes a pigment. As the colorant, a dye may be used together with the pigment.

Examples of the pigment include inorganic pigments such as iron oxide (for example, Bengala), titanium oxide, titanium yellow, zinc flower, white lead, zinc sulfate, lithopone, antimony oxide, cobalt blue and carbon black; and organic pigments such as quinacridone red, phthalocyanine blue, phthalocyanine green, permanent red, hansa yellow, indanthrene blue, brilliant fast scarlet and benzimidazolone yellow.

Example of the pigment further includes a glitter pigment. Examples of the glitter pigment include metal powders such as pearl pigment, aluminum powder and stainless steel powder; metal flakes; glass beads; glass flakes; mica; and scale-like iron oxide (MIO).

The colorant may be used alone or as mixtures of two or more kinds.

The content of colorant is selected depending on the kind of pigment, and color, brightness, depth and the like required in the coating film.

For example, the content of the colorant is preferably 1 mass % or more and 70 mass % or less, and more preferably 2 mass % or more and 60 mass % or less, based on the whole resin constituting powdered particles.

The powdered particles preferably contain as a colorant a color pigment other than while pigment, together with while pigment. When the powdered particles contain white pigment together with color pigment, color of the surface of an object to be coated is hidden by a coating film, and color development of the color pigment is improved. Examples of the white pigment include the conventional white pigments such as titanium oxide, barium sulfate, zinc oxide and calcium carbonate. Of those, titanium oxide is preferred from the standpoint of high whiteness (that is, high hiding properties).

Divalent or More Metal Ion

The powdered particles preferably contain divalent or more metal ion (hereinafter simply referred to as "metal ion"). The metal ion is a component contained in both the core part and the resin coated part of the powdered particles when the powdered particles are core•shell type particles as described hereinafter.

When the powdered particles contain divalent or more metal ion, ionic crosslinking by metal ion is formed in the powdered particles. For example, a functional group of the thermosetting resin (when a thermosetting polyester resin has been used as a thermosetting resin, a carboxyl group or a hydroxyl group of the thermosetting polyester resin) and metal ion interact with each other, thereby forming ionic crosslinking. By this ionic crosslinking, the phenomenon (so-called bleeding) that inclusions (thermosetting agent, colorant added as necessary other than the thermosetting agent, other additives and the like) of the powdered particles precipitate on the surface of the powdered particles is suppressed, and storage properties are easy to be increased. Furthermore, the bond of the ionic crosslinking breaks by heating when coating the powdered paint and then thermally hardening the same. As a result, melt viscosity of the powdered particles is decreased, and a coating film having high smoothness is easy to be formed.

Examples of the metal ion include divalent or more and tetravalent or less metal ions. Specifically, the metal ion is at least one metal ion selected from the group consisting of aluminum ion, magnesium ion, iron ion, zinc ion and calcium ion.

Examples of the supply source (compound to be contained as an additive in powdered particles) of the metal ion include a metal salt, an inorganic metal salt polymer and a metal complex. The metal salt and inorganic metal salt polymer are added as a flocculant to the powdered particles in the case of preparing the powdered particles by an agglomerating and coalescing method.

Examples of the metal salt include aluminum sulfate, aluminum chloride, magnesium chloride, magnesium sulfate, iron (II) chloride, zinc chloride, calcium chloride and calcium sulfate.

Examples of the inorganic metal salt polymer include poly aluminum chloride, poly aluminum hydroxide, poly iron (II) sulfate and poly calcium sulfide.

Example of the metal complex includes a metal salt of aminocarboxylic acid. Examples of the metal complex specifically include metal salts (for example, calcium salt, magnesium salt, iron salt and aluminum salt) based on the conventional chelate such as ethylenediaminetetraacetic acid, propanediaminetetraacetic acid, nitrilotriacetic acid, triethylenetetraminehexaacetic acid or diethylenetriaminepentaacetic acid.

The supply source of those metal ions may be added as mere additives, not for use as a flocculant.

The metal ion is easy to form network ionic crosslinking as the valence thereof is high, and this is preferred in smoothness of a coating film and storage properties of a powdered paint. For this reason, Al ion is preferred as the metal ion. In other words, the supply source of the metal ion is preferably an aluminum salt (for example, aluminum sulfate or aluminum chloride) and an aluminum salt polymer (for example, poly aluminum chloride or poly aluminum hydroxide). Furthermore, of the supply sources of metal ion, an inorganic metal salt polymer is preferred as compared with a metal salt even though the valence of metal ion is the same, in smoothness of a coating film and storage properties of a powdered paint. For this reason, the supply source of the metal ion is particularly preferably an aluminum salt polymer (for example, poly aluminum chloride or poly aluminum hydroxide).

The content of the metal ion is preferably 0.002 mass % or more and 0.2 mass % or less, and more preferably 0.005 mass % or more and 0.15 mass % or more, based on the whole powdered particles in smoothness of a coating film and storage properties of a powdered paint.

When the content of the metal ion is 0.002 mass % or more, appropriate ionic crosslinking by the metal ion is formed, bleeding of the powdered particles is suppressed, and storage properties of a powdered paint tends to be increased. On the other hand, when the content of the metal ion is 0.2 mass % or less, excessive formation of ionic crosslinking by the metal ion is suppressed, and smoothness of a coating film tends to be increased.

In the case of preparing the powdered particles by an agglomerating and coalescing method, the supply source (metal salt or metal salt polymer) of the metal ion to be added as a flocculant contributes to the control of particle size distribution and shape of the powdered particles.

Specifically, higher valence of the metal ion is preferred in obtaining narrow particle size distribution. Furthermore, a metal salt polymer is preferred in obtaining narrow particle size distribution as compared with a metal salt even though the valence of the metal ion is the same. For this reason, the supply source of the metal ion is preferably an aluminum salt (for example, aluminum sulfate or aluminum chloride) and an aluminum salt polymer (for example, poly aluminum chloride or poly aluminum hydroxide), and particularly preferably an aluminum salt polymer (for example, poly aluminum chloride or poly aluminum hydroxide).

When the flocculant is added such that the content of the metal ion is 0.002 mass % or more, flocculation of resin particles in an aqueous medium proceeds and this contributes to realization of narrow particle size distribution. Furthermore, flocculation of resin particles constituting a resin coated part proceeds to agglomerates constituting a core part, and this contributes to realization of formation of a resin coated part to the whole surface of the core part. On the other hand, when the flocculant is added such that the content of the metal ion is 0.2 mass % or less, excessive formation of ionic crosslinking in the agglomerates is suppressed, and when fusing and coalescing, the shape of powdered particles formed tends to approach a spherical shape. For this reason, the content of the metal ion is preferably 0.002 mass % or more and 0.2 mass % or less, and more preferably 0.005 mass % or more and 0.15 mass % or less, from those standpoints.

The content of the metal ion is measured by quantitatively analyzing fluorescent X-ray intensity of the powdered particles. Specifically, a resin is mixed with the source of a metal ion to obtain a resin mixture having known concentration of the metal ion. A pellet sample is obtained from 200 mg of the resin mixture using a tablet forming machine having a diameter of 13 mm. Mass of the pellet sample is accurately weighed, and the pellet sample is subjected to fluorescent X-ray intensity measurement to obtain peak strength. A pellet sample obtained by changing the addition amount of the supply source of the metal ion is similarly subjected to the measurement. A calibration curve is prepared from those results. The content of the metal ion in powdered particles to be measured is quantitatively analyzed using the calibration curve.

Examples of a method for adjusting the content of a metal ion include 1) a method of adjusting the addition amount of a supply source of a metal ion, and 2) in the case of preparing powdered particles by an agglomerating and coalescing method, a method of adding a flocculant (for example, a metal salt or a metal salt polymer) as the supply source of a metal ion in an agglomerating step, adding a chelating agent (for example, EDTA (ethylenediaminetetraacetic acid), DTPA (diethylenetriaminepentaacetic acid) or NTA (nitrilotriacetic acid)) at the end of the agglomerating step to form a complex with the metal ion by the chelating agent, removing a complex salt formed in the subsequent cleaning step and the like, and adjusting the content of the metal ion.

Other Additives

Examples of the other additives include various additives used in a powdered paint.

Examples of the other additives specifically include a bubbling inhibitor (for example, benzoin or a benzoin derivative), a hardening accelerator (an amine compound, an imidazole compound, a cationic polymerization catalyst or the like), a surface conditioner (a leveling agent), a plasticizer, a charge control agent, an antioxidant, a pigment dispersant, a flame retardant and a fluidity imparting agent.

Core•Shell Type Particles

In the present embodiment, the powdered particles may be core•shell type particles having a core part containing a thermosetting resin and a thermosetting agent, and a resin coated part covering the surface of the core part.

In this case, the core part may contain the above-described colorant and other additives as necessary in addition to the thermosetting resin and the thermosetting agent.

The resin coated part in the core•shell type particles is described below.

The resin coated part may be constituted of only a resin and may contain other component (a thermosetting agent, other additives and the like described as components constituting the core part).

However, the resin coated part is preferably constituted of only a resin from the standpoint of reduction of bleeding. Even in the case where the resin coated part contains other components other than the resin, it is preferred that the resin occupies 90 mass % or more (preferably 95 mass % or more) of the whole resin coated part.

The resin constituting the resin coated part may be a non-hardening resin and may be a thermosetting resin. However, the thermosetting resin is preferred from the standpoint of improvement of hardening density (crosslinking density) of a coating film.

When a thermosetting resin is used as a resin of the resin coated part, examples of the thermosetting resin include the same thermosetting resins as in the core part, and the preferred examples thereof are the same. However, the thermosetting resin of the resin coated part may be the same kind as the thermosetting resin of the core part, and may be different resin.

When a non-hardening resin is used as a resin of the resin coated part, the non-hardening resin is preferably at least one selected from the group consisting of an acryl resin and a polyester resin.

A coverage of the resin coated part is preferably 30% or more and 100% or less, and more preferably 50% or more and 100% or less, from the standpoint of suppression of bleeding.

The coverage of the resin coated part on the surface of the powdered particles is a value obtained by XPS (X-ray photoemission spectroscopy) measurement.

Specifically, XPS measurement is performed using JPS-9000MX, manufactured by JEOL Ltd., as a measurement instrument, using MgKa ray as X-ray source and setting accelerated voltage to 10 kV and emission current to 30 mA.

From the spectrum obtained under the above conditions, components due to materials of the core part on the surface of the powdered particles are peak-separated from components due to materials of the resin coated part, and coverage of the resin coated part on the surface of the powdered particles is quantified. The peak separation separates spectra measured to each component using curve fitting by least-squares method.

As the component spectrum as a base of separation, spectrum obtained by individually measuring a thermosetting resin, a hardener, a pigment, additives and a coating resin that were used in the preparation of the powdered particles is used. The coverage is obtained from the proportion of spectrum intensity due to the coating resin to the total of whole spectrum intensity obtained in the powdered particles.

The thickness of the resin coated part is preferably 0.2 µm or more and 4 µm or less, and preferably 0.3 µm or more and 3 µm or less, from the standpoint of suppression of bleeding.

The thickness of the resin coated part is a value measured by the following method. The powdered particles are embedded in an epoxy resin or the like, and then cut with a diamond knife or the like to prepare a thin section. The thin section is observed with a transmission electron microscope (TEM) or the like and cross-sectional images of a plurality of the powdered particles are taken. The thickness of the resin coated part is measured at 20 places from the cross-sectional images of the powdered particles, and its average value is used. When the resin coated part is difficult to be observed in a cross-sectional image due to a clear powdered paint or the like, the resin coated part can be easily observed and measured by conducting dyeing.

Properties of Powdered particles

Volume Particle Size Distribution Index GSDv

The volume particle size distribution index GSDv of the powdered particles is preferably 1.50 or less, more preferably 1.40 or less, and still more preferably 1.30 or less, from the standpoint of smoothness of a coating film and storage properties of a powdered paint. When the volume particle size distribution index GSDv is 1.40 or less, deterioration of smoothness of the coating film is suppressed.

Volume Average Particle Diameter D50v

The volume average particle diameter D50v of the powdered particles is preferably 1 µm or more and 25 µm or less, more preferably 2 µm or more and 20 µm or less, and still more preferably 3 µm or more and 15 µm or less, from the standpoint of formation of a coating film having high smoothness in small amount of the powdered particles.

When the particle diameter of the powdered particles contained in the powder coating is small (for example, the volume average particle diameter is 10 µm or less), a coating film having further excellent smoothness can be formed, but on the other hand, the surface area as the whole powdered paint is increased as compared with the case that the particle diameter is larger. As a result, the influence of accumulation of electric charge becomes further large, and coating film roughness caused by the pocks is easy to be generated. However, according to the present embodiment, the accumulation of electric charge in an adherent layer is reduced as described above, and the generation of coating film roughness caused by the pocks is suppressed. From those standpoints, the volume average particle diameter D50v is further preferably a range of 3 µm or more and 10 µm or less.

Average Circularity

Average Circularity of the powdered particles is preferably 0.97 or more, more preferably 0.98 or more, and still more preferably 0.99 or more.

When the average circularity of the powdered particles is 0.97 or more, it is possible to obtain a powdered paint in which generation of coating film roughness has been suppressed.

The detail of the mechanism that a powder coating in which generation of coating film roughness has been suppressed is obtained is not clear. However, when the average circularity of the powdered particles is 0.97 or more, the density of the powdered particles in a coating film is increased when forming the coating film, and surface area per unit mass of the powdered particles is decreased, so that charge retention of the powdered particles in the coating film is also decreased. Therefore, it is presumed that electrostatic repulsion of the mutual powdered particles is suppressed and generation of coating film roughness is suppressed.

The volume average particle diameter D50v of the powdered particles and volume particle size distribution index GSDv are measured by Coulter Multisizer II (manufactured by Beckman•Coulter) using ISOTON-II (manufactured by Beckman•Coulter) as an electrolyte solution.

In measuring, 0.5 mg or more and 50 mg or less of a measurement sample is added to 2 ml of 5% aqueous solution of a surfactant (sodium alkyl benzene sulfonate is preferred) as a dispersant. The resulting solution is added to 100 ml or more and 150 ml of less of an electrolyte solution.

The electrolyte solution having the sample suspended therein is subjected to a dispersion treatment with an ultrasonic disperser for 1 minute, and the particle size distribution of particles having a particle diameter in a range of 2 µm or more and 60 µm or less is measured by Coulter Multisizer II using an aperture having an aperture diameter of 100 µm. The number of sampling particles is 50,000.

Cumulative distribution of volumes to the respective size ranges (channels) partitioned based on the particle size distribution measured is drawn from a small diameter side. The particle diameter at the accumulation of 16% is defined as volume particle diameter D16v, the particle diameter at the accumulation of 50% is defined as volume particle diameter D50v, and the particle diameter at the accumulation of 84% is defined as volume particle diameter D84v.

The volume particle size distribution index (GSDv) is calculated as $(D84v/D16v)^{1/2}$.

The average circularity of the powdered particles is measured using a flow type particle image analyzer FPIA-3000 (manufactured by Sysmex Corporation). Specifically, 0.1 ml or more and 0.5 ml or less of a surfactant (alkyl benzene sulfonate) is added as a dispersant to 100 ml or more and 150 ml or less of water from which solid impurities have previously been removed, and 0.1 g or more and 0.5 g or less of measurement sample is then added thereto. The resulting suspension having dispersed therein the measurement sample is subjected to a dispersion treatment for 1 minute or less and 3 minutes or less, thereby adjusting the concentration of the dispersion to 3,000 numbers/µl or more and 10,000 numbers/µl or less. The average circularity of the powdered particles in the dispersion is measured using a flow type particle image analyzer.

The average circularity of the powdered particles is a value obtained by obtaining a circularity (Ci) of each of n particles in powdered particles and then calculating by the following formula. In the following formula, Ci is a circularity (=length of circumference of circle equivalent to projected area of particle/length of circumference of projected image of particle), and fi is a frequency of powdered particles.

$$\text{Average circularity } (Ca) = \left(\sum_{i=1}^{n}(Ci \times fi)\right) \bigg/ \sum_{i=1}^{n}(fi)$$

Production Method of Powdered Paint

A production method of a powdered paint according to the present embodiment is described below.

The powdered paint according to the present embodiment is obtained by producing powdered particles and then externally adding external additives containing inorganic particles to the powdered particles.

The powdered particles may be produced by any of a dry process (for example, a kneading and grinding method) or a wet process (for example, an agglomerating and coalescing method, a suspension polymerization method or a dissolution suspension method). The production method of the powdered particles is not particularly limited to those production methods, and the conventional methods are used.

For example, the dry process includes 1) a kneading and grinding method of kneading, grinding and classifying a thermosetting resin and other raw materials, a dry process of changing the shape of the particles obtained by the kneading and grinding method by mechanical impact force or thermal energy, and the like.

On the other hand, the wet process includes 1) an agglomerating and coalescing method of obtaining powdered particles by mixing a dispersion obtained by emulsion polymerizing polymerizable monomers for obtaining a thermosetting resin with a dispersion of other raw materials, followed by agglomerating and thermal welding, 2) a suspension polymerization method of suspending polymerizable monomers for obtaining a thermosetting resin and a solution of other raw materials in an aqueous medium, followed by polymerizing, 3) a dissolution suspension method of suspending a thermosetting resin and a solution of other raw materials in an aqueous medium, followed by granulating, and the like. The wet process can be preferably used in that thermal influence is small.

The powdered particles as core•shell type particles may be obtained by using the powdered particles obtained by the above production process as a core part (core) and adhering resin particles thereto, followed by heating and fusing.

Of those methods, the powdered particles are preferably obtained by an agglomerating and coalescing method from the standpoint that the volume particle size distribution index GSDv, the volume average particle diameter D50v and the average circularity can be easily controlled to the above-described preferred ranges.

The agglomerating and coalescing method for producing the powdered particles as core•shell type particles is described as an example.

Specifically, it is preferred that the powdered particles are obtained through a step of forming first agglomerated particles by agglomerating first resin particles containing a thermosetting resin, and a thermosetting agent in a dispersion having dispersed therein the first resin particles and the thermosetting agent, or agglomerating composite particles containing a thermosetting resin and a thermosetting agent in a dispersion having dispersed therein the composite particles (formation step of first agglomerated particles);

a step of mixing the first agglomerated particle dispersion having dispersed therein the first agglomerated particles therein with a second resin particle dispersion having dispersed therein second resin particles containing a resin to agglomerate the second resin particles on the surface of the first agglomerated particles, thereby forming second agglomerated particles having the second resin particles adhered to the surface of the first agglomerated particles (formation step of second agglomerated particles); and a step of heating the second agglomerated particle dispersion having dispersed therein the second agglomerated particles to fuse and coalesce the second agglomerated particles (fusing and coalescing step).

The powdered particles produced by the agglomerating and coalescing method are that the part in which the first agglomerated particles have been fused and coalesced constitutes a core part and the part in which the second agglomerated particles adhered to the surface of the first agglomerated particles have been fused and coalesced constitutes a resin coated part.

Therefore, when the first agglomerated particles formed in the formation step of first agglomerated particles are supplied to a fusing and coalescing step without passing through the formation step of second agglomerated particles, and fused and coalesced in place of the second agglomerated particles, powdered particles having a single layer structure are obtained.

The detail of each step is described below.

A production method of powdered particles containing a colorant is described in the following description, but the colorant is contained as necessary.

Preparation Process of Each Dispersion

Each dispersion used in the agglomerating and coalescing method is prepared.

Specifically, a first resin particle dispersion having dispersed therein first resin particles containing a thermosetting resin of a core part, a thermosetting agent dispersion having dispersed therein a thermosetting agent, a colorant dispersion having dispersed therein a colorant, and a second resin particle dispersion having dispersed therein second resin particles containing a resin of a resin coated part are prepared.

Furthermore, a composite particle dispersion having dispersed therein composite particles containing a thermosetting resin for a core part and a thermosetting agent is prepared in place of the first resin particle dispersion and the thermosetting agent dispersion.

In each step of the production method of a powdered paint, the first resin particles, second resin particles and composite particles are collectively called "resin particles", and dispersions of those resin particles are called "resin particle dispersions".

The resin particle dispersion is prepared by, for example, dispersing resin particles in a dispersion medium by a surfactant.

The dispersion medium used in the resin particle dispersion includes an aqueous medium.

Examples of the aqueous medium include water such as distilled water or ion-exchanged water; and alcohols. Those may be used in one kind alone or as mixtures of two or more kinds thereof.

Examples of the surfactant include an anionic surfactant such as sulfate type, sulfonate type, phosphate type or soap type; a cationic surfactant such as amine salt type or quaternary ammonium salt type; and a nonionic surfactant such as polyethylene glycol type, alkyl phenol ethylene oxide adduct type or polyhydric alcohol type. Of those, an anionic surfactant and a cationic surfactant are particularly preferably used. A nonionic surfactant may be used together with an anionic surfactant or a cationic surfactant.

The surfactant may be used in one kind alone, and may be used as mixtures of two or more kinds thereof. Two kinds or more of surfactants are used, and a part of the surfactants is slightly remained due to the difference of solubility in water, thereby electric charge of a powdered paint can be adjusted.

In the resin particle dispersion, examples of a method of dispersing the resin particles in a dispersion medium include general dispersion methods such as a rotational shear type homogenizer, a ball mill having media, a sand mill or Dinomill. Furthermore, depending on the kind of resin particles, the resin particles may be dispersed in a resin particle dispersion using, for example, a phase inversion emulsification process.

The phase inversion emulsification process is a process in which a resin to be dispersed is dissolved in a resin-soluble hydrophobic organic solvent, a base is added to an organic continuous phase (0 phase) to neutralize, and an aqueous medium (W phase) is then added thereto, thereby conversion of a resin of from W/0 to 0/W (so-called phase inversion) is performed to form a discontinuous phase and the resin is dispersed in the form of particles in an aqueous medium.

A preparation method of the resin particle dispersion specifically includes the following method.

For example, when the resin particle dispersion is a polyester resin particle dispersion having dispersed therein polyester resin particles, the polyester resin particle dispersion is obtained by polycondensing raw material monomers by heat melting under reduced pressure, adding a polycondensate thus obtained to a solvent (for example, ethyl acetate) to dissolve therein, stirring the resulting solution while adding a weakly alkaline aqueous solution thereto, and performing phase inversion emulsification.

When the resin particle dispersion is a composite particle dispersion, the composite particle dispersion is obtained by mixing a thermosetting resin with a thermosetting agent and dispersing (for example, emulsification such as phase inversion emulsification) the resulting mixture in a dispersion medium.

The volume average particle diameter of the resin particles to be dispersed in the resin particle dispersion is, for example, 1 μm or less, preferably 0.1 μm or more and 1 μm or less, more preferably 0.08 μm or more and 0.8 μm or less, and still more preferably 0.1 μm or more and 0.6 μm or less.

The volume average particle diameter of the resin particles is measured as follows. Accumulation distribution of volumes in particle ranges (channels) partitioned is drawn from a small particle diameter side using particle size distribution obtained by measuring with a laser diffraction particle size distribution measuring instrument (for example, LA-700, manufactured by Horiba, Ltd.), and a particle diameter at the accumulation of 50% to the whole particles is measured as a volume average particle diameter D50v. Volume average particle diameter of particles in other dispersion is similarly measured.

The conventional emulsification method can be used to prepare the resin particle dispersion, but a phase inversion emulsification process in which particle size distribution obtained is narrow and a volume average particle diameter is easy to set to a range of 1 μm or less (particularly, 0.08 μm or more and 0.40 μm or less) is effective.

The phase inversion emulsification process is as follows. A resin is dissolved in an organic solvent dissolving the resin, an amphiphilic organic solvent alone, or a mixed solvent to form an oil phase. A basic compound is added dropwise in small amount while stirring the oil phase, water is added dropwise little by little while stirring, and water droplets are taken in the oil phase. When the amount of water added dropwise exceeds a certain amount, an oil phase and a water phase are inversed, and the oil phase converts into oil droplets. Thereafter, an aqueous dispersion is obtained through a desolventizing step under reduced pressure.

The amphiphilic organic solvent is an organic solvent having the solubility in water at 20° C. of at least 5 g/L or more, and desirably 10 g/L or more. The organic solvent having the solubility less than 5 g/L is poor in the effect of accelerating an aqueous treatment speed, and the aqueous dispersion obtained is poor in storage stability. Examples of the amphiphilic organic solvent include alcohols such as ethanol, n-propanol, isopropanol, n-butanol, isobutanol, sec-butanol, tert-butanol, n-amyl alcohol, isoamyl alcohol, sec-amyl alcohol, tert-amyl alcohol, 1-ethyl-1-propanol, 2-methyl-1-butanol, n-hehanol or cyclohexanol; ketones such as methyl ethyl ketone, methyl isobutyl ketone, ethyl butyl ketone, cyclohexanone or isophorone; ethers such as tetrahydrofuran or dioxane; esters such as ethyl acetate, n-propyl acetate, isopropyl acetate, n-butyl acetate, isobutyl acetate, sec-butyl acetate, 3-methoxybutyl acetate, methyl propionate, ethyl propionate, diethyl carbonate or dimethyl carbonate; glycol derivatives such as ethylene glycol, ethylene glycol monomethyl ether, ethylene glycol monoethyl ether, ethylene glycol monopropyl ether, ethylene glycol monobutyl ether, ethylene glycol ethyl ether acetate, diethylene glycol, diethylene glycol monomethyl ether, diethylene glycol monoethyl ether, diethylene glycol monopropyl ether, diethylene glycol monobutyl ether, diethylene glycol ethyl ether, propylene glycol, propylene glycol monomethyl ether, propylene glycol monopropyl ether, propylene glycol monobutyl ether, propylene glycol methyl ether acetate or dipropylene glycol monobutyl ether; 3-methoxy-3-methyl butanol, 3-methoxybutanol, acetonitrile, dimethyl formamide, dimethyl acetoamide, diacetone alcohol and ethyl acetoacetate. Those solvents can be used alone or as mixtures of two or more kinds thereof.

The thermosetting polyester resin as a thermosetting resin is neutralized with a basic compound in dispersing in an aqueous medium. Neutralization reaction of the thermosetting polyester resin with a carboxyl group causes the thermosetting polyester resin to disperse in the aqueous medium, and agglomeration among particles of the thermosetting polyester resin is easy to be suppressed by electric repulsion among carboxyl anions formed on the particles.

Examples of the basic compound include ammonia and an organic amine compound having a boiling point of 250° C. or lower. Examples of the preferred organic amine compound include triethylamine, N,N-diethylethanolamine, N,N-dimethylethanolamine, aminoethanolamine, N-methyl-N,N-diethanolamine, isopropylamine, iminobispropylamine, ethylamine, diethylamine, 3-ethoxypropylamine, 3-diethylaminopropylamine, sec-butylamine, propylamine, methylaminopropylamine, dimethylaminopropylamine, methyliminobispropylamine, 3-methoxypropylamine, monoethanolamine, diethanolamine, triethanolamine, morpholine, N-methylmorpholine and N-ethylmorpholine.

The basic compound is preferably added in an amount capable of at least partially neutralizing carboxyl groups contained in the thermosetting polyester resin. Specifically, the basic compound is added in an amount of preferably 0.2 times equivalent or more and 9.0 times equivalent or less, and more preferably 0.6 times equivalent or more and 2.0 times equivalent or less, based on the carboxyl group. When the amount of the basic compound is 0.2 times equivalent or more, the effect of adding the basic compound is easy to be recognized. When the amount of the basic compound is 9.0 times equivalent or less, it appears that this is for suppressing excessive increase of hydrophilicity of an oil phase. However, a particle size distribution is difficult to widen, and it is easy to obtain good dispersion.

The content of the resin particles contained in the resin particle dispersion is, for example, preferably 5 mass % or more and 50 mass % or less, and more preferably 10 mass % or more and 40 mass % or less.

The thermosetting agent dispersion and colorant dispersion are prepared similar to the resin particle dispersion. In other words, the volume average particle diameter of the resin particles, dispersion medium, dispersion method and content of particles in the resin particle dispersion can similarly apply to the particles of the colorant to be dispersed in the colorant dispersion and the particles of the hardener to be dispersed in the hardener dispersion.

Formation Step of First Agglomerated Particles

The first resin particle dispersion, the thermosetting agent dispersion and the colorant dispersion are mixed with each other.

The first resin particles, thermosetting agent dispersion and colorant are subjected to heteroagglomeration in the mixed dispersion to form the first agglomerated particles containing the first resin particles, thermosetting agent and colorant, having a diameter near a diameter of the target powdered particles.

Specifically, for example, a flocculant is added to the mixed dispersion and simultaneously pH of the mixed dispersion is adjusted to be acidic (for example, pH is 2 or more and 5 or less). After adding a dispersion stabilizer as necessary, the mixed dispersion is heated to a glass transition temperature of the first resin particles (specifically, for example, glass transition temperature of first resin particles—30° C. or more and glass transition temperature—10° C. or less) to agglutinate the particles dispersed in the mixed dispersion. Thus, the first agglomerated particles are formed.

In the formation step of the first agglomerated particles, the first agglomerated particles may be formed by mixing a composite particle dispersion containing the thermosetting resin and the thermosetting agent with the colorant dispersion and subjecting the composite particles and the colorant to heteroagglomeration in the mixed dispersion.

The formation step of the first agglomerated particles may be performed such that the flocculant is added to the mixed dispersion at room temperature (for example, 25° C.) under stirring with a rotational shear type homogenizer, pH of the mixed dispersion is adjusted to be acidic (for example, pH is 2 or more and 5 or less), the dispersion stabilizer is added as necessary, and the heating is then conducted.

Examples of the flocculant include a surfactant each having a polarity reverse to that of the surfactant used as a dispersant added to the mixed dispersion, a metal salt, a metal salt polymer and a metal complex. When a metal complex is used as the flocculant, the amount of the surfactant used is decreased, and charge characteristics are improved.

After completion of the agglomeration, additives forming a complex or a similar bond with a metal ion of a flocculant may be added as necessary. A chelating agent is preferably used as the additives. By the addition of the chelating agent, when the flocculant is excessively added, the adjustment of content of a metal ion of the powdered particles is realized.

The metal salt, metal salt polymer and metal complex as a flocculant are used as a supply source of a metal ion. Examples of those are already described above.

The chelating agent includes a water-soluble chelating agent. Examples of the chelating agent specifically include oxycarboxylic acid such as tartaric acid, citric acid or gluconic acid; iminodiacid (IDA), nitrotriacetic acid (NTA) and ethylenediaminetetraacetic acid (EDTA).

The amount of the chelating acid added is, for example, 0.01 parts by mass or more and 5.0 parts by mass or less, and preferably 0.1 parts by mass or more and less than 3.0 parts by mass, per 100 parts by mass of the resin particles.

Formation Step of Second Agglomerated Particles

The first agglomerated particle dispersion having dispersed therein the first agglomerated particles obtained is mixed with a second resin particle dispersion.

The second resin particles may be the same kind as the first resin particles and may be a kind different from the first resin particles.

The second resin particles are agglomerated so as to adhere to the surface of the first resin particles in the mixed dispersion having dispersed therein the first resin particles and the second resin particles. Thus, the second agglomerated particles in which the second resin particles have been adhered to the surface of the first resin particles are formed.

Specifically, for example, when the particle diameter of the first agglomerated particles has reached a desired particle diameter in the formation step of first agglomerated particles, the second resin particle dispersion is mixed with the first agglomerated particle dispersion, and the resulting mixed dispersion is heated at a temperature of or lower than the glass transition temperature of the second resin particles.

Agglomeration progress is stopped by setting pH of the mixed dispersion to a range of, for example, 6.5 or more and 8.5 or less.

By this, the second agglomerated particles agglomerated such that the second resin particles adhere to the surface of the first agglomerated particles are obtained. Electric charge of the powdered paint can be adjusted by controlling the amount of the second resin particles and pH.

Fusing and Coalescing Step

The second agglomerated particle dispersion having dispersed therein the second agglomerated particles is heated to a temperature of or higher than the glass transition temperature of the first and second resin particles (for example, a temperature 10 to 30° C. higher than the glass transition temperature of the first and second resin particles or higher) to fuse and coalesce the second agglomerated particles. Thus, powdered particles are formed.

The powdered particles are obtained through the above steps.

After completion of the fusing and coalescing step, the powdered particles formed in the dispersion are passed through the conventional cleaning step, solid-liquid separation step and drying step, thereby obtaining powdered particles in a dried state.

The cleaning step is preferably conducted by sufficiently performing displacement washing by ion-exchanged water from the standpoint of electrostatic properties. The solid-liquid separation step is not particularly limited, but suction filtration, pressure filtration or the like is preferably carried out from the standpoint of productivity. The drying step is not particularly limited in its method, but freeze drying, airflow drying, fluidized bed drying, vibration type fluidized bed drying or the like is preferably carried out from the standpoint of productivity.

The powdered paint according to the present embodiment is produced by adding inorganic particles to the dry powdered particles obtained, and mixing those.

The mixing is conducted using, for example, V blender, Henschel mixer or Lodige mixer.

As necessary, coarse particles in the powdered particles may be removed using a vibration sieving machine, a wind power sieving machine or the like.

Electrostatic Powder Coating Method

The electrostatic powder coating method according to the present embodiment has a step of discharging a charged powdered paint that is the powdered paint according to the present embodiment and adhering (coating) the powdered paint to an object to be coated (hereinafter referred to as "coating step") and a step of heating the powdered paint adhered to the object to be coated to form a coating film (hereinafter referred to as "baking step").

Each step is described below.

Coating Step

In the coating step, the charged powdered paint is applied, and the powdered paint is electrostatically adhered (coated) to an object to be coated to form an adherent layer.

Specifically, in the coating step, for example, the charged powdered paint is applied from an outlet port of an electrostatic powder coating machine in the state that electrostatic field has been formed between the outlet port of the electrostatic powder coating machine and a coating surface (a surface having conductivity) of an object to be coated, and the powdered paint is electrostatically adhered to the surface of the object to be coated to form an adherent layer. In other words, for example, voltage is applied as the surface to be coated of the ground object to be coated being an anode and the electrostatic powder coating machine being a cathode to form electrostatic field in both electrodes, the charged powdered paint is flied and electrostatically adhered to the coating surface of the object to be coated, and a film of the powdered paint is formed.

The coating step may be conducted while relatively moving the outlet port of the electrostatic powder coating machine and the coating surface of the object to be coated.

As the electrostatic powder coating machine, the conventional electrostatic powder coating machines such as a corona gun (coating machine discharging charged powdered paint with corona discharge), a tribogun (coating machine discharging a powdered paint by triboelectric charging) or a bell gun (coating machine discharging by centrifugally jetting charged power coating material with corona discharge or triboelectric charging) can be used. Discharging conditions for achieving good coating are the setting ranges of each gun.

The adhering amount of the powdered paint to be adhered to the coating surface of the object to be coated is 20 g/m$^2$ or more and 100 g/m$^2$ or less (preferably 25 g/m$^2$ or more and 50 g/m$^2$ or less) from the standpoint of suppression of variation of smoothness of the coating film.

On the other hand, when the thickness of the coating film formed on the object to be coated is increased, that is, the adhering amount is increased (for example, adhering amount is 120 g/m$^2$ or more), electric charge is easy to be accumulated. As a result, coating film roughness caused by the pocks is easy to be generated. However, according to the present embodiment, the accumulation of electric charge in the adherent layer is reduced and the generation of coating film roughness caused by the pocks is suppressed, as described above.

Baking Step

In the baking step, the adherent layer is heated to form a coating film. Specifically, by heating, powdered particles of a film of the powdered paint are melted and simultaneously hardened, thereby forming a coating film.

The heating temperature (baking temperature) is selected depending on the kind of the powdered paint. As one example, the heating temperature (baking temperature) is preferably 90° C. or higher and 250° C. or lower, more preferably 100° C. or higher and 220° C. or lower, and still more preferably 120° C. or higher and 200° C. or lower. The heating time (baking time) is adjusted depending on the heating temperature (baking temperature).

Object to be Coated

An object to be coated that is a target article to be coated with the powdered paint is not particularly limited, and examples thereof include various metal parts, ceramic parts and resin parts. Those target articles may be unmolded articles before molding into each article such as a plate-shaped article or a linear article, and may be a molded article molded into an article for an electronic part, road vehicle or building interior and exterior materials. The target article may be an article previously subjected to a surface treatment such as a primer treatment, a plating treatment or electrodeposition.

The electrostatic powder coating method of the present invention preferably has a first coating step of applying a first powdered paint and coating a first adherent layer in which when electric charge amount of an adherent layer after 30 seconds from the completion of adhesion is Q30 and electric charge amount of an adherent layer after 300 seconds from the completion of adhesion is Q300, an attenuation factor represented by an absolute value of (Q30−Q300)/Q30 is 30% or more and 60% or less, a second coating step of applying a second powdered paint onto the first adherent layer to coat a second adherent layer thereon, and a baking step of heating the first adherent layer and the second adherent layer to bake those layers.

According to the powdered paint of the present embodiment, the generation of coating film roughness (called "defect") of the coating film obtained after the baking step is suppressed. The reason for this is not clear, but it is assumed as follows.

Conventionally, a powdered paint (powdered particles) used in powder coating is produced by mixing a binder resin and as necessary a hardener for hardening the binder resin, with other components such as a pigment for coloration, a flame retardant and a leveling agent, melting the resulting mixture, and pulverizing into particles having a desired particle diameter. The powdered paint thus produced is coated on an object to be coated by a method such as an electrostatic coating method. The electrostatic coating method is a method of electrostatically adhering powdered particles to a grounded object to be coated, by applying the powdered particles charged by contact charging or corona discharge using a spray gun.

However, when a coating film was formed by 2 coat 1 bake method using the conventional powdered paint, particularly when the particle diameter of the powdered particles contained in the first powdered paint is small (for example, 10 μm or less), coating film roughness was generated in the coating film obtained in some cases.

It is assumed that because the total thickness of adherent layer is increased (for example, the total thickness of a coating layer is 50 μm or more) by coating two adherent layers, electric charge accumulates in the first adherent layer and the second adherent layer, electrostatic repulsion is generated, and as a result, coating film roughness is caused.

The electrostatic repulsion means the phenomenon that when the thickness of a layer of powdered particles becomes excessively large, electric charge of a pole opposite an object to be coated is induced, and the powdered particles repel with each other, thereby generating circular (crater-shaped) depressions.

The generation of coating film roughness is suppressed by applying the first powdered paint and coating a first adherent layer in which when electric charge amount of an adherent layer after 30 seconds from the completion of adhesion is Q30 and electric charge amount of an adherent layer after 300 seconds from the completion of adhesion is Q300, an attenuation factor represented by an absolute value of (Q30−Q300)/Q30 (sometimes simply referred to as "attenuation factor") is 30% or more and 60% or less.

It is assumed that when the attenuation factor of the first adherent layer is 30% or more, charge leakage (leakage of electric charge) of electric charge into an object to be coated occurs, and the accumulation of electric charge that is the cause of electrostatic repulsion in the adherent layer is eliminated.

Furthermore, when the attenuation factor of the first adherent layer is 60% or less, the first powdered paint contained in the first adherent layer has electric charge during applying the first powdered paint and the second powdered paint. As a result, the first powdered paint or the second powdered paint has excellent electrostatic adhesion, for example, the phenomenon that powdered particles are flied by airflow during coating is suppressed, and a coating film is formed.

The detail of each step included in the electrostatic powder coating method according to the present embodiment is described below.

First Coating Step

In the first coating step, a charged first powdered paint is applied, and the first powdered paint is electrostatically adhered to an object to be coated, thereby coating a first adherent layer.

Specifically, in the first coating step, for example, the charged first powdered paint is applied from a outlet port of an electrostatic powder coating machine in the state that electrostatic field has been formed between the outlet port of the electrostatic powder coating machine and a coating surface (a surface having conductivity) of an object to be coated, and the first powdered paint is electrostatically adhered to the surface of the object to be coated to coat the first adherent layer. In other words, for example, voltage is applied as the surface to be coated of the ground object to be coated being an anode and the electrostatic powder coating machine being a cathode to form electrostatic field in both electrodes, the charged powdered paint is flied and electro-statically adhered to the coating surface of the object to be coated, and a film of the powdered paint is formed.

The coating step may be conducted while relatively moving the outlet port of the electrostatic powder coating machine and the coating surface of the object to be coated.

As the electrostatic powder coating machine, the conventional electrostatic powder coating machines such as a corona gun (coating machine applying charged powdered paint with corona discharge), a tribogun (coating machine applying a powdered paint by triboelectric charging) or a bell gun (coating machine applying charged power coating material with corona discharge or triboelectric charging) can be used. Applying conditions for achieving good coating are the setting ranges of each gun.

The adhering amount of the powdered paint to be adhered to the coating surface of the object to be coated is 20 g/m$^2$ or more and 100 g/m$^2$ or less (preferably 25 g/m$^2$ or more and 50 g/m$^2$ or less) from the standpoint of suppression of variation of smoothness of the coating film.

Attenuation Factor

The attenuation factor in the first adherent layer is 30% or more and 60% or less, preferably 30% or more and 55% or less, and more preferably 32% or more and 50% or less.

In the present embodiment, when electric charge amount of the adherent layer after 30 seconds from the completion of adhesion is Q30 and electric charge amount after 300 seconds from the completion of adhesion is Q300, the attenuation factor of the adherent layer is represented by an absolute value of (Q30−Q300)/Q30.

The Q30 and Q300 are calculated by the following method.

The electric charge amount of the adherent layer is measured using Faraday gauge, and is measured using a suction type portable electrification measuring instrument (charge measuring instrument EA02 System, manufactured by U-TEC).

Powdered particles contained in an adherent layer are directly taken in a filter in Faraday gauge by a suction nozzle, the electric charge amount and mass are measured, and the electric charge amount per unit mass of the powdered particles is obtained. The electric charge amount per unit mass of powdered particles is measured at optional 10 places of the adherent layer, and its arithmetic mean value is used as the electric charge amount of the adherent layer.

First Powdered Paint

The first powdered paint preferably contains powdered particles and inorganic particles. The details of the preferred embodiment of the powdered particles and the production method of the first powdered paint are descried hereinafter.

Second Coating Step

In the second coating step, the charged second powdered paint is applied, and the second powdered paint is electrostatically adhered to the first adherent layer to coat a second adherent layer. As the applying method of the second powdered paint in the second coating step, the same method as the adhering method of the first powdered paint in the first coating method can be used, and the preferred embodiment is the same.

Attenuation Factor

In the electrostatic powder coating method of the present embodiment, the attenuation factor, represented by an absolute value of (q30-q300)/q30 wherein q30 represents electric charge amount in the second adherent layer 30 seconds after forming the second adherent layer and q300 represents electric charge amount in the second adherent layer 300 seconds after forming the second adherent layer, in the second adherent layer is preferably 60% or less, more preferably 30% or more and 60% or less, still more preferably 30% or more and 55% or less, and particularly preferably 30% or more and 50% or less.

When the attenuation factor in the second adherent layer is 60% or less, the second adherent layer has excellent electrostatic adhesion during applying the second powdered paint, for example, the phenomenon that powdered particles are flied by airflow during coating is suppressed, and a coating film is easy to be formed.

When the attenuation factor in the second adherent layer is 30% or more, coating film roughness is further suppressed. It is considered that the reason for this is that electrostatic repulsion of mutual second powdered paints is suppressed.

In the electrostatic powder coating method of the present embodiment, the surface of the first adherent layer approaches a flat surface. Therefore, even in the case where the second adherent layer having an attenuation factor, represented by an absolute value of $(q30-q300)/q30$ wherein $q30$ represents electric charge amount in the second adherent layer 30 seconds after forming the second adherent layer and $q300$ represents electric charge amount in the second adherent layer 300 seconds after forming the second adherent layer, less than 30% has been coated, the generation of coating film roughness is suppressed.

When the attenuation factor in the second adherent layer is less than 30%, the effect of suppressing the generation of the coating film roughness is particularly easy to be obtained in the case where the adhering amount of the second powdered paint in the second adherent layer is 20 g/m$^2$ or more and 50 g/m$^2$ or less.

Second Powdered Paint

The second powdered paint preferably contains powdered particles and inorganic particles.

The second powdered paint is preferably a clear powdered paint.

Therefore, in the powdered particles contained in the second powdered paint, the content of colorant described hereinafter is preferably less than 25 mass %, more preferably less than 20 mass %, still more preferably less than 10 mass %, particularly preferably less than 5 mass %, and most preferably less than 1 mass %, based on the whole mass of the powdered particles. The lower limit of the content of the colorant is not particularly limited, and may be 0 mass %.

The powdered particles contained in the second powdered paint are synonymous with the powdered particles contained in the first powdered paint, in the elements other than the content of the colorant, and the preferred embodiment is the same.

The production method of the second powdered paint is synonymous with the production method of the first powdered paint, except that the content of the colorant in the powdered particles is within the above range, and the preferred embodiment is the same.

Inorganic Particles

The second powdered paint according to the present embodiment preferably contains inorganic particles. The inorganic particles are externally added to the surface of the powdered particles.

When the attenuation factor in the second adherent layer is 30% or more and 60% or less, the inorganic particles contained in the second powdered paint are synonymous with the inorganic particle in the first powdered paint, and the preferred embodiment is the same.

When the attenuation factor in the second adherent layer is 30% or more and 60% or less, the inorganic particles contained in the first powdered paint and the inorganic particles contained in the second powdered paint are preferably the same inorganic particles from the standpoint of reduction of uneven coating.

When the attenuation factor in the second adherent layer is less than 30%, the inorganic particles contained in the second powdered paint are not particularly limited, and examples thereof include particles of $SiO_2$, $TiO_2$, $Al_2O_3$, $CuO$, $ZnO$, $SnO_2$, $CeO_2$, $Fe_2O_3$, $MgO$, $BaO$, $CaO$, $K_2O$, $Na_2O$, $ZrO_2$, $CaO.SiO_2$, $K_2O.(TiO_2)_n$, $Al_2O_3.2SiO_2$, $CaCO_3$, $MgCO_3$, $BaSO_4$ and $MgSO_4$. Silica particles ($SiO_2$ particles) are preferred.

When the inorganic particles contain silica particles, the coating film obtained has excellent smoothness. This is assumed to be due to that fluidity of the second powdered paint is improved. The effect that the coating film obtained has excellent smoothness is particularly easy to be obtained when the adhering amount of the second powdered paint in the second adherent layer is 20 g/m$^2$ or more and 50 g/m$^2$ or less.

The surface of the inorganic particles as external additive is preferably subjected to a hydrophobization treatment. The hydrophobization treatment is conducted by, for example, dipping the inorganic particles in a hydrophobization treatment agent. The hydrophobization treatment agent is not particularly limited, and examples thereof include a silane coupling agent, a silicone oil, a titanate silane coupling agent and an aluminum coupling agent. Those may be used in one kind alone or may be used as mixtures of two or more kinds thereof.

The amount of the hydrophobization treatment agent is generally, for example, 1 part by mass or more and 10 parts by mass or less, per 100 parts by mass of the inorganic particles.

The volume average particle diameter of the inorganic particles is preferably 5 nm or more and 200 nm or less, more preferably 7 nm or more and 100 nm or less, and still more preferably 10 nm or more and 50 nm or less.

Baking Step

In the baking step, the first adherent layer and second adherent layer are heated to form a coating film. Specifically, powdered particles of a film of the powdered paint are melted and simultaneously hardened by heating, thereby forming a coating film.

The heating temperature (baking temperature) is selected depending on the kind of the powdered paint. As one example, the heating temperature (baking temperature) is preferably 90° C. or higher and 250° C. or lower, more preferably 100° C. or higher and 220° C. or lower, and still more preferably 120° C. or higher and 200° C. or lower. The heating time (baking time) is adjusted depending on the heating temperature (baking temperature).

Object to be Coated

An object to be coated that is a target article to be coated with the powdered paint is not particularly limited, and examples thereof include various metal parts, ceramic parts and resin parts. Those target articles may be unmolded articles before molding into each article such as a plate-shaped article or a linear article, and may be a molded article molded into an article for an electronic part, road vehicle or building interior and exterior materials. The target article may be an article previously subjected to a surface treatment such as a primer treatment, a plating treatment or electrodeposition.

The powdered particles contained in the first powdered paint and the second powdered paint, and production methods of the respective powdered paints are described below.

Powdered Particles

The powdered particles contained in the first powdered paint and the second powdered paint preferably contain a thermosetting resin and a thermosetting agent. The powdered particles may contain a colorant and other additives as necessary.

The powdered particles contained in the first powdered paint are preferably a colored powdered paint having the content of the colorant of 25 mass % or more based on the total mass of the powdered particles.

The powdered particles contained in the second powdered paint are preferably a clear powdered paint having the content of the colorant less than 25 mass % based on the total mass of the powdered particles.

The thermosetting resin in the first powdered paint and the thermosetting resin in the second powdered paint are preferably the same resin from the standpoint of suppression of uneven coloration of the coating film.

Examples of a method for adjusting the content of a metal ion include 1) a method of adjusting the addition amount of a supply source of a metal ion, and 2) in the case of preparing powdered particles by an agglomerating and coalescing method, a method of adding a flocculant (for example, a metal salt or a metal salt polymer) as the supply source of a metal ion in an agglomerating step, adding a chelating agent (for example, EDTA (ethylenediaminetetraacetic acid), DTPA (diethylenetriaminepentaacetic acid) or NTA (nitrilotriacetic acid)) at the end of the agglomerating step to form a complex with the metal ion by the chelating agent, removing a complex salt formed in the subsequent cleaning step and the like, and adjusting the content of the metal ion.

Other Additives

Examples of the other additives include various additives used in a powdered paint.

Examples of the other additives specifically include a foam (pinhole) inhibitor (for example, benzoin or a benzoin derivative), a hardening accelerator (an amine compound, an imidazole compound, a cationic polymerization catalyst or the like), a surface conditioner (a leveling agent), a plasticizer, a charge control agent, an antioxidant, a pigment dispersant, a flame retardant and a fluidity imparting agent.

Examples of the surfactant include an anionic surfactant such as sulfate type, sulfonate type, phosphate type or soap type; a cationic surfactant such as amine salt type or quaternary ammonium salt type; and a nonionic surfactant such as polyethylene glycol type, alkyl phenol ethylene oxide adduct type or polyhydric alcohol type. Of those, an anionic surfactant and a cationic surfactant are particularly preferably used. A nonionic surfactant may be used together with an anionic surfactant or a cationic surfactant.

The surfactant may be used in one kind alone, and may be used as mixtures of two or more kinds thereof. Two or more kinds of surfactants are used, and a part of the surfactants is slightly remained due to the difference of solubility in water, thereby electric charge of a powdered paint can be adjusted. Particularly, electric charge can be controlled by that the amount and kind of the surfactant contained in the first powdered paint differ from those of the surfactant contained in the second powdered paint.

Coating Step

In the coating step, the charged first powdered paint is applied, and the first powdered paint is electrically adhered (coated) to an object to be coated to form a first adherent layer.

Specifically, in the coating step, for example, the charged first powdered paint is applied from a outlet port of an electrostatic powder coating machine in the state that electrostatic field has been formed between the outlet port of the electrostatic powder coating machine and a coating surface (a surface having conductivity) of the object to be coated, and the first powdered paint is electrostatically adhered to the surface of the object to be coated to form a first adherent layer. In other words, for example, voltage is applied as the surface of the ground object to be coated being an anode and the electrostatic powder coating machine being a cathode to form electrostatic field in both electrodes, the charged powdered paint is flied and electrostatically adhered to the coating surface of the object to be coated, and a film of the powdered paint is formed.

Thereafter, the second powdered paint is applied on the first adherent layer of the first powdered paint to coat a second adherent layer. The formation conditions of electrostatic field are preferably the same as those when applying the first powdered paint, but can be changed by the difference in electric charge of a powder, or the like.

The coating step may be conducted while relatively moving the outlet port of the electrostatic powder coating machine and the coating surface of the object to be coated.

Ad the electrostatic powder coating machine, the conventional electrostatic powder coating machines such as a corona gun (coating machine applying charged powdered paint with corona discharge), a tribogun (coating machine applying a powdered paint by triboelectric charging) or a bell gun (coating machine applying charged power coating material with corona discharge or triboelectric charging) can be used. Applying conditions for achieving good coating are the setting ranges of each gun.

The total adhering amount of the powdered paint to be adhered to the coating surface of the object to be coated is 20 g/m$^2$ or more and 100 g/m$^2$ or less (preferably 25 g/m$^2$ or more and 50 g/m$^2$ or less) from the standpoint of suppression of variation of smoothness of the coating film.

On the other hand, when the thickness of the coating film formed on the object to be coated is increased, that is, the adhering amount is increased (for example, adhering amount is 120 g/m$^2$ or more), electric charge is easy to be accumulated. As a result, coating film roughness caused by the pocks is easy to be generated. However, according to the present embodiment, the accumulation of electric charge in the adherent layer is reduced and the generation of coating film roughness caused by the pocks is suppressed, as described above.

EXAMPLES

The present embodiment is described in detail below by reference to examples, but the present invention is not construed as being limited to those examples. In the following description, unless otherwise indicated, "parts" and "%" are all mass basis.

Preparation of Powdered Particles

Preparation of while Pigment Dispersion (W1)

Titanium oxide (A-220, manufactured by Ishihara Sangyo Kaisha, Ltd.): 100 parts by mass Anionic surfactant (Neogen RK, manufactured by DKS Co., Ltd.): 15 parts by mass Nonionic surfactant (Newcol 2310, manufactured by Nippon Nyukazai Co., Ltd.): 0.2 parts by mass Ion-exchanged water: 400 parts by mass 0.3 mol/l nitric acid: 4 parts by mass The above materials were mixed, dissolved and dispersed for 3 hours using a high pressure impact type disperser ultimizer (HJP30006, manufactured by Sugino Machine Limited Co., Ltd.) to prepare a white pigment dispersion having dispersed therein the titanium oxide. As a result of measurement using a laser diffraction particle size analyzer, the volume average particle diameter of titanium oxide in the pigment dispersion was 0.25 μm, and the proportion of solid contents in the white pigment dispersion was 25%.

Preparation of Polyester•Hardener Composite dispersion (E1)

A mixed solvent of 180 parts by mass of ethyl acetate and 80 parts by mass of isopropyl alcohol was placed in a reaction tank (BJ-30N, manufactured by Tokyo Rikakiki Co., Ltd.) equipped with a condenser, a thermometer, a water dropping apparatus and an anchor blade while maintaining the reaction tank at 40° C. by a water circulation type thermostat bath, and the following composition was placed in the reaction tank.

Polyester resin (PES1) [polycondensate of terephthalic acid/ethylene glycol/neopentyl glycol/trimethylpropane (molar ratio=100/60/38/2 (mol %), glass transition temperature=62° C., acid value (Av)=12 mgKOH/g, hydroxyl group (OHv)=55 mgKOH/g, weight average molecular weight (Mw)=12,000, number average molecular weight (Mn)=4,000]: 240 parts by mass Blocked isocyanate hardener VESTAGON B1530 (manufactured by EVONIK): 60 parts by mass Benzoin: 1.5 parts by mass Acryl oligomer (ACRONAL 4F, manufactured by BASF): 3 parts by mass After placing, the resulting mixture was stirred at 150 rpm using a three-one motor and dissolved to obtain an oil phase. A mixed liquid of 1 part by mass of 10 mass % ammonia aqueous solution and 47 parts by mass of 5 mass % sodium hydroxide aqueous solution was added dropwise for 5 minutes to the stirring oil phase, and after mixing for 10 minutes, 900 parts by mass of ion-exchanged water were further added dropwise in a rate of 5 parts by mass per minute to perform phase inversion. Thus, an emulsion was obtained.

Immediately, 800 parts by mass of the emulsion obtained and 700 parts by mass of ion-exchanged water were placed in a 2 liter eggplant flask, and the flask was set to an evaporator (manufactured by Tokyo Rikakiki Co., Ltd.) equipped with a vacuum control unit through a spherical trap. While rotating the eggplant flask, the eggplant flask was heated with 60° C. hot water bath, and while taking care of bumping, pressure in the eggplant flask was reduced to 7 kPa to remove a solvent. At the time that the amount of the solvent recovered reached 1,100 parts by mass, the pressure was returned to ordinary pressure (1 atom), and the eggplant flask was cooled with water to obtain a dispersion. The dispersion obtained was free of odor of the solvent. The volume average particle diameter of the resin particles in the dispersion was 145 nm. Thereafter, an anionic surfactant (Dowfax 2A1, manufactured by Dow Chemical, effective component amount: 45 mass %) was added to and mixed with the dispersion in an amount of 2 mass % in terms of the effective component based on the resin content in the dispersion, ion-exchanged water was added, and the solid content concentration was adjusted so as to be 25 mass %. The resulting liquid was used as polyester resin•hardener composite dispersion (E1).

Preparation of White Powdered Particles (PC1)

Agglomeration Step

Polyester resin•hardener composite dispersion (E1): 180 parts by mass (solid content: 45 parts)

White pigment dispersion (W1): 160 parts by mass (solid content: 40 parts by mass)

Ion-exchanged water: 200 parts by mass

The above materials were mixed and dispersed in a round stainless steel flask using a homogenizer (ULTRA-TURRAX T50, manufactured by IKA). The pH was adjusted to 3.5 using 1.0 mass % nitric acid aqueous solution. 0.50 parts by mass of 10 mass % poly aluminum chloride aqueous solution was added to the resulting mixture, and dispersion operation was continued by ULTRA-TURRAX.

After stirring, a mantle heater was set, and the resulting slurry was heated to 50° C. while adjusting the stirring revolution such that the slurry was sufficiently stirred, and then maintained at 50° C. for 15 minutes. Thereafter, 0.10 parts by mass of 10 mass % poly aluminum chloride aqueous solution was added. The particle diameter of the agglomerates was measured with a coulter counter "Multisizer II model" (aperture diameter: 50 μm, manufactured by Beckman-Coulter), and when the volume average particle size reached 5.5 μm, 60 parts by mass of polyester resin•hardener composite dispersion (E1) was gradually added as a shell.

Fusing and Coalescing Step

After maintaining for 30 minutes from the addition, the pH was adjusted to 7.0 using 5% sodium hydroxide aqueous solution. Thereafter, the temperature was increased to 85° C., followed by maintaining for 2 hours.

Filtration, Cleaning and Drying Steps

After completion of the reaction, the solution in the flask was cooled in a rate of 3° C./min, and filtered to obtain a solid component. The solid component was washed with ion-exchanged water, and then subjected to solid-liquid separation by Nutsche suction filtration to again obtain a solid component.

The solid component was again dispersed in 3 liters of ion-exchanged water at 40° C., and cleaned under stirring at 300 rpm for 15 minutes. The cleaning operation was repeated 5 times, and the solid component obtained by solid-liquid separation by Nutsche suction filtration was vacuum dried for 12 hours to obtain white powdered particles (PC1).

As a result of measuring the particle diameter of the white powdered particles (PC1), the volume average particle diameter D50v was 6.1 μm, and the volume particle size distribution index GSDv was 1.24. The average circularity was 0.98.

Preparation of Clear Power Particles (PC2)

Clear powdered particles (PC2) were prepared in the same manner as in the preparation of white powdered particles (PC1), except that in the agglomeration step, white pigment was not added, that is, the white pigment dispersion (W1) was not used and only the polyester resin•hardener composite dispersion (E1) and ion-exchanged water were used.

As a result of measuring the particle diameter of the clear powdered particles (PC2), the volume average particle diameter D50v was 6.4 μm, and the volume particle size distribution index GSDv was 1.24. The average circularity was 0.97. Preparation of Kneaded and Ground White-Colored Powdered particles (PC3)

Titanium oxide (A-220, manufacture by Ishihara Sangyo Kaisha, Ltd.): 200 parts by mass Polyester resin (PES1) [polycondensate of terephthalic acid/ethylene glycol/neopentyl glycol/trimethylpropane (molar ratio=100/60/38/2 (mol %), glass transition temperature=62° C., acid value (Av)=12 mgKOH/g, hydroxyl group (OHv)=55 mgKOH/g, weight average molecular weight (Mw)=12,000, number average molecular weight (Mn)=4,000]: 240 parts by mass Blocked isocyanate hardener VESTAGON B1530 (manufactured by EVONIK): 60 parts by mass Benzoin: 1.5 parts by mass Acryl oligomer (ACRONAL 4F, manufactured by BASF): 3 parts by mass The above materials were premixed with a mixer, kneaded while heating at 100° C. with an extruder, and then roughly ground to form flake shape. The resulting flake was finely ground using a turbomill for the purpose of a particle diameter of 6 μm, and then subjected to classification. Thus, kneaded and ground white powdered paint (PC3) was obtained.

As a result of measuring the particle diameter of the kneaded and ground white powdered particles (PC3), the volume average particle diameter D50v was 6.81 μm, and the volume particle size distribution index GSDv was 1.13.

Preparation of Fluorine Resin-Containing Powdered particles (PC4)
Preparation of Oil Phase 1
  Fluorine resin LUMIFLON (registered trademark) LF710F (manufactured by Asahi Glass Co., Ltd., glass transition temperature=51° C., hydroxyl value (OHv) =46 mgKOH/g): 100.0 parts by mass
  Blocked isocyanate hardener VESTAGON B1530 (manufactured by EVONIK): 20 parts by mass
  Ethyl acetate: 100 parts by mass The above materials were placed in a beaker and stirred at 3000 rpm for 1 minutes using a disper (manufactured by PRIMIX Corporation) to prepare oil phase 1.

Preparation of Aqueous Phase 1
  50% aqueous solution of sodium deodecyldiphenyl ether disulfonate (ELEMINOL MON-7, manufactured by Sanyo Chemical Industries, Ltd.): 30.0 parts by mass
  1% aqueous solution of carboxymethyl cellulose: 100.0 part by mass
  Ion-exchanged water: 400.0 parts by mass The above materials were placed in a vessel and stirred at 5000 rpm for 1 minute by TK homomixer (manufactured by PRIMIX Corporation) to prepare aqueous phase 1.

The oil phase 1 was poured in the aqueous phase 1, the number of revolutions of TK homomixer was increased to 10,000 rpm, the stirring was continued for 1 minute, and the oil phase 1 was suspended in the aqueous phase 1 to obtain particle dispersion. The solvent was removed at 30° C. under reduced pressure of 50 mmHg, the operation of filtration and redispersing in ion-exchanged water was repeated to remove the surfactant remained in the slurry. Thus, a filter cake was obtained. After drying, classification was conducted to obtain fluorine resin-containing powdered particles (PC4).

As a result of measurement of the particle diameter of the fluorine resin-containing powdered particles (PC4), the volume average particle diameter D50v was 6.55 μm, and the volume particle size distribution index GSDv was 1.19. The average circularity was 0.96.

Preparation of Inorganic Particles
The details of the inorganic particles used in the examples are shown in Table 1 below.

TABLE 1

| | Volume average particle diameter | Aspect ratio | Particle composition |
|---|---|---|---|
| M1 | 15 nm | 3.5 | Titania particles (rutile type) MT150W, manufactured by TAYCA |
| M2 | 80 nm | 3.3 | Titania particles (rutile type) MT700, manufactured by TAYCA |
| M3 | 270 nm | 3 | Titania particles (rutile type) JR, manufactured by TAYCA |
| M4 | 15 nm | 6 | Titania particles (rutile type) TTO-V-3, manufactured by Ishihara Sangyo Kaisha, Ltd. |

TABLE 1-continued

| | Volume average particle diameter | Aspect ratio | Particle composition |
|---|---|---|---|
| M5 | 35 nm | 1.1 | Zinc oxide particles MZ300, manufactured by TAYCA |
| M6 | 20 nm | 1.05 | Titania particles (anatase type) P25, manufactured by EVONIC |
| M7 | | | Hydrophobization-treated titania particles 10% decylsilane treatment, MT150AW, manufactured by TAYCA |
| M8 | | | Conductive titanium oxide FT-1000, manufactured by Ishihara Sangyo Kaisha, Ltd. |

Example 1

White powdered particles (PC1): 100 parts by mass, inorganic particles (M1): 1.2 parts by mass and hydrophobic silica particles having a volume average particle diameter of 12 nm (R974, manufactured by Nippon Aerosil): 0.5 parts by mass were mixed in circumferential speed of 32 m/s for 10 minutes using Henschel mixer, and coarse particles were then removed using a sieve of 45 μm mesh. Thus, a white powdered paint was obtained.

Examples 2 to 9 and Comparative Examples 1 and 2

Powdered paints were obtained in the same manner as in Example 1, except for changing the powdered particles and inorganic particles used to the particles shown in Table 2 below.

Electrostatic Powder Coating

Corona gun XR4-110C manufactured by Asahi Sunac Corporation was charged with each powdered paint.

The powdered paint was applied to a square shaped test panel (an object to be coated) having a size of 30 cm×30 cm made of a mirror finished aluminum plate in a distance of 20 cm from the front surface of the panel (distance between the panel and a outlet port of the corona gun) by vertically and horizontally sliding the corona gun XR4-110C manufactured by Asahi Sunac Corporation, and electrostatically adhered to the panel. Thus, an adherent layer was obtained. Coating in which applied voltage of the corona gun of the corona gun is 80 kV, input air pressure is 0.55 MPa, a discharge amount is 100 g/min and an adhering amount of the powdered paint to be adhered to the panel is 50 g/m$^2$, 90 g/m$^2$, 180 g/m$^2$ or 220 g/m$^2$ was carried out 4 times.

Thereafter, each panel was placed in a high temperature chamber set to 180° C. and heated (baked) for 30 minutes.

Measurement of Attenuation Factor

An attenuation factor $AF_{[30-300]}$ (%) represented by an absolute value of [(Q30−Q300)/Q30], where Q30 represents electric charge amount in the adherent layer including 100 g/m$^2$ of the powdered paint 30 seconds after forming the adherent layer from the completion of adhesion and Q300 represents electric charge amount in the adherent layer 300 seconds after forming the adherent layer, was measured by the method described before.

Furthermore, an attenuation factor $AF_{[30-200]}$ (%) represented by an absolute value of [(Q30−Q200)/Q30], where Q30 represents electric charge amount in the adherent layer 30 seconds after forming the adherent layer and Q200 represents electric charge amount in the adherent layer 200 seconds after forming the adherent layer, and an attenuation factor $AF_{[30-300]}$ (%) represented by an absolute value of [(Q30−Q100)/Q30], where Q30 represents electric charge amount in the adherent layer 30 seconds after forming the adherent layer and Q100 represents electric charge amount in the adherent layer 100 seconds after forming the adherent layer, were measured by the methods described before.

Evaluation of Coating Film Roughness

An adherent layer was formed in each adhering amount, and the surface of a coating film after baking by the above method was observed and evaluated by the following evaluations of 4 categories. When the evaluation is "1" or "2", the adherent layer can be practically used. Evaluation results are shown in Table 2. Evaluation standard 1: Coating film roughness caused by the pocks is not recognized on a coating film surface
2: Coating film roughness caused by the pocks is slightly recognized
3: Coating film roughness (bursting trace and uneven coating) is recognized
4: There is a place on which coating film is not formed, on a coating surface, and as a result, there is a place on which a square shaped test panel is visually recognized Evaluation of Light Resistance The panel having the adhering amount of a powdered paint of 50.0 g/m$^2$, produced in the evaluation of coating film roughness was irradiated with light (light source: xenon lamp, irradiance: 540 W/m$^2$=100 kluxes, no UV cut filer).

After completion of the light irradiation, the coating film surface was wiped with a cloth containing water, and the coating film roughness was evaluated in the same manner as above. The evaluation results are shown in Table 2.

PCC2 to PCC9 that are colored powdered paints and PCCL1 to PCCL9 that are clear powdered paints were obtained in the same manner as in Example 1, except that the blue powdered particles and inorganic powdered particles used were changed as show in Table 3 below.

In PCCL9, the inorganic particles corresponding to the above-described M1 to M8 were not added, and the amount of the hydrophobic silica particles added was changed from 0.5 parts by mass to 0.6 parts by mass.

TABLE 3

| Powdered paint | Powdered particles | Inorganic particles |
|---|---|---|
| PCC1 | White powdered particles (1) | M1 |
| PCC2 | White powdered particles (2) | M1 |
| PCC3 | White powdered particles (2) | M2 |
| PCC4 | White powdered particles (2) | M3 |
| PCC5 | White powdered particles (2) | M4 |
| PCC6 | White powdered particles (2) | M5 |
| PCC7 | White powdered particles (1) | M6 |
| PCC8 | White powdered particles (1) | M7 |
| PCC9 | White powdered particles (1) | M8 |
| PCCL1 | White powdered particles (2) | M1 |
| PCCL2 | White powdered particles (2) | M2 |
| PCCL3 | White powdered particles (2) | M3 |
| PCCL4 | White powdered particles (2) | M4 |
| PCCL5 | White powdered particles (2) | M5 |
| PCCL6 | White powdered particles (2) | M6 |
| PCCL7 | White powdered particles (2) | M7 |
| PCCL8 | White powdered particles (2) | M8 |
| PCCL9 | White powdered particles (2) | Only silica particles |

TABLE 2

| | Powder particles | Inorganic particles | Attenuation factor (%) of charged amount | | | Coating film roughness Adhering amount (g/m$^2$) | | | | Light resistance |
| | | | Attenuation factor$_{[30-300]}$ | Attenuation factor$_{[30-200]}$ | Attenuation factor$_{[30-100]}$ | 50 | 90 | 180 | 220 | |
|---|---|---|---|---|---|---|---|---|---|---|
| Example 1 | PC1 | M1 | 36 | 21 | 10 | 1 | 1 | 1 | 1 | 1 |
| Example 2 | PC2 | M1 | 38 | 25 | 17 | 1 | 1 | 1 | 2 | 1 |
| Example 3 | PC3 | M1 | 33 | 19 | 9 | 1 | 1 | 1 | 1 | 1 |
| Example 4 | PC1 | M2 | 33 | 20 | 9 | 1 | 1 | 1 | 1 | 1 |
| Example 5 | PC1 | M3 | 34 | 22 | 10 | 1 | 1 | 1 | 2 | 1 |
| Example 6 | PC1 | M4 | 58 | 28 | 19 | 1 | 1 | 1 | 2 | 1 |
| Example 7 | PC1 | M5 | 32 | 16 | 7 | 1 | 1 | 1 | 2 | 1 |
| Example 8 | PC1 | M6 | 37 | 18 | 15 | 1 | 1 | 1 | 1 | 2 |
| Example 9 | PC4 | M1 | 36 | 19 | 15 | 1 | 1 | 1 | 2 | 1 |
| Comparative Example 1 | PC1 | M7 | 28 | 12 | 4 | 1 | 1 | 3 | 3 | 1 |
| Comparative Example 2 | PC1 | M8 | 80 | 37 | 25 | 3 | 3 | 4 | 4 | 1 |

As shown in Table 2, it is understood that in each example using the powdered paint having the attenuation factor AF$_{[30-300]}$ in a range of 30% or more and 60% or less, the generation of coating film roughness in the coating film formed is suppressed as compared with each comparative example having the attenuation factor AF$_{[30-300]}$ outside the range.

Preparation of White Powdered paint (PCC1)

White powdered particles (C1): 100 parts by mass, the inorganic particles M1: 1.2 parts by mass and hydrophobic silica particles having a volume average particle diameter of 12 nm (R974, manufactured by Nippon Aerosil): 0.5 parts by mass were mixed in circumferential speed of 32 m/s for 10 minutes using Henschel mixer, and coarse particles were then removed using a sieve of 45 μm mesh. Thus, a white powdered paint (PCC1) was obtained.

Examples 10 to 21 and Comparative Examples 3 to 8

Using each powdered paint, electrostatic powder coating was carried out as follows.

Electrostatic Powder Coating

Corona gun XR4-110C manufactured by Asahi Sunac Corporation was charged with each powdered paint.

The first powdered paint shown in Table 4 was applied to a square shaped test panel (an object to be coated) having a size of 30 cm×30 cm made of a mirror finished aluminum plate in a distance of 30 cm from the front surface of the panel (distance between the panel and a outlet port of the corona gun) by vertically and horizontally sliding the corona gun XR4-110C manufactured by Asahi Sunac Corporation, and electrostatically adhered to the panel. Thus, a first adherent layer was obtained. Coating in which applied voltage of the corona gun of the corona gun is 80 kV, input air pressure is 0.55 MPa, a discharge amount is 200 g/min and an adhering amount of the powdered paint to be adhered to the panel is 25 g/m², 45 g/m², 90 g/m² or 110 g/m² was carried out 4 times.

In Comparative Example 3 and Comparative Example 6, applying of the second powdered paint was not conducted, and the adhering amount of the first powdered paint was 50 g/m², 90 g/m², 180 g/m² or 220 g/m².

The second powdered paint was applied to the panel having the first powdered paint electrostatically adhered thereto under the same conditions as above. Thus, a second adherent layer was obtained.

Each panel was placed in a high temperature chamber set to 180° C. and heated (baked) for 30 minutes.

Evaluation of Coating Film Roughness

The surface of a coating film after baking by the above method in each adhering amount was observed and evaluated by the following evaluations of 4 categories. The evaluation results are shown in Table 4.

Evaluation Standard
1: Coating film roughness is not recognized on a coating film surface
2: Coating film roughness is slightly recognized
3: Coating film roughness is recognized
4: Coating film is not formed on a coating surface, and there is a place on which a square shaped test panel is visually recognized Evaluation of Light Resistance The panel having the adhering amount of a powdered paint of 50.0 g/m², produced in the evaluation of coating film roughness was irradiated with light (light source: xenon lamp, irradiance: 540 W/m²=100 kluxes, no UV cut filer) for 500 hours.

After completion of the light irradiation, the coating film surface was wiped with a cloth containing water, and the coating film roughness was evaluated in the same manner as above. The evaluation results are shown in Table 4.

TABLE 4

| | First powdered paint | Second powdered paint | Attenuation factor of first adherent layer (%) | Attenuation factor of second adherent layer (%) | Coating film roughness Total adhering amount (g/m²) | | | | Light resistance |
|---|---|---|---|---|---|---|---|---|---|
| | | | | | 50 | 90 | 180 | 220 | |
| Example 10 | PCC1 | PCCL1 | 35 | 35 | 1 | 1 | 1 | 1 | 1 |
| Example 11 | PCC2 | PCCL1 | 34 | 35 | 1 | 1 | 1 | 1 | 1 |
| Example 12 | PCC3 | PCCL2 | 33 | 34 | 1 | 1 | 1 | 1 | 1 |
| Example 13 | PCC4 | PCCL3 | 34 | 33 | 1 | 1 | 1 | 1 | 1 |
| Example 14 | PCC5 | PCCL4 | 58 | 57 | 1 | 1 | 1 | 1 | 1 |
| Example 15 | PCC6 | PCCL5 | 33 | 33 | 1 | 1 | 1 | 2 | 1 |
| Example 16 | PCC7 | PCCL6 | 37 | 36 | 1 | 1 | 1 | 1 | 2 |
| Example 17 | PCC1 | PCCL6 | 36 | 36 | 1 | 1 | 1 | 1 | 2 |
| Example 18 | PCC1 | PCCL3 | 35 | 33 | 1 | 1 | 1 | 1 | 1 |
| Example 19 | PCC1 | PCCL7 | 35 | 28 | 1 | 1 | 1 | 3 | 1 |
| Example 20 | PCC1 | PCCL8 | 35 | 80 | 1 | 1 | 1 | 3 | 3 |
| Example 21 | PCC1 | PCCL9 | 35 | 26 | 1 | 1 | 2 | 3 | 1 |
| Comparative Example 3 | PCC8 | — | 28 | — | 1 | 1 | 3 | 3 | 1 |
| Comparative Example 4 | PCC8 | PCCL7 | 28 | 37 | 1 | 1 | 3 | 3 | 1 |
| Comparative Example 5 | PCC8 | PCCL1 | 28 | 35 | 1 | 1 | 3 | 3 | 1 |
| Comparative Example 6 | PCC9 | — | 80 | — | 4 | 4 | 4 | 4 | 4 |
| Comparative Example 7 | PCC9 | PCCL8 | 80 | 80 | 4 | 4 | 4 | 4 | 4 |
| Comparative Example 8 | PCC9 | PCCL1 | 80 | 35 | 3 | 3 | 4 | 4 | 1 |

What is claimed is:

1. A powdered paint comprising powdered particles and inorganic particles, the powdered paint having an attenuation factor $AF_{[30-300]}$ (%) represented by an absolute value of [(Q30-Q300)/Q30] is 30% or more and 60% or less, and an attenuation factor $AF_{[30-100]}$ (%) represented by an absolute value of [(Q30-Q100)/Q30] is 5% or more and 15% or less,
wherein Q30 represents electric charge amount in an adherent layer including 100 g/m² of the powdered paint adhered to a substrate 30 seconds after forming the adherent layer, Q300 represents electric charge amount in the adherent layer 300 seconds after forming the adherent layer, and 0100 represents electric charge amount in the adherent layer 100 seconds after forming the adherent layer, and
the inorganic particles have an aspect ratio of 3.3 or more and 5 or less.

2. The powdered paint according to claim 1, further having an attenuation factor $AF_{[30-200]}$ (%) represented by an absolute value of [(Q30-Q200)/Q30] is 15% or more and 30% or less,
wherein Q200 represents electric charge amount in the adherent layer 200 seconds after forming the adherent layer.

3. The powdered paint according to claim 1, wherein the powdered particles have a volume average particle diameter of 3 μm or more and 10 μm or less.

4. The powdered paint according to claim 1, wherein the inorganic particles have a volume average particle diameter of 10 nm or more and 100 nm or less.

5. The powdered paint according to claim 1, wherein the inorganic particles are contained in an amount of 0.1 mass % or more and 3 mass % or less based on the whole mass of the powdered particles.

6. The powdered paint according to claim 1, having a dielectric loss factor of $40 \times 10^{-3}$ or more and $150 \times 10^{-3}$ or less.

7. The powdered paint according to claim 1, wherein the powdered particles comprise a thermosetting polyester resin.

8. The powdered paint according to claim 7, wherein the thermosetting polyester resin has a total of an acid value and a hydroxyl value of 10 mgKOH/g or more and 250 mgKOH/g or less.

9. The powdered paint according to claim 7, wherein the thermosetting polyester resin has a number average molecular weight of 1,000 or more and 100,000 or less.

10. The powdered paint according to claim 1, wherein the powdered particles comprise a thermosetting (meth)acryl resin.

11. The powdered paint according to claim 10, wherein the thermosetting (meth)acryl resin has a number average molecular weight of 1,000 or more and 100,000 or less.

12. The powdered paint according to claim 10, wherein the powdered particles comprise the thermosetting (meth)acryl resin in an amount of 20 mass % or more and 99 mass % or less of the powdered particles.

13. The powdered paint according to claim 12, comprising a thermosetting agent in an amount of 1 mass % or more and 30 mass % or less of the thermosetting (meth)acryl resin.

14. The powdered paint according to claim 1, comprising a metal capable of having a valence of 2 or more.

15. The powdered paint according to claim 14, wherein the metal is contained in an amount of 0.002 mass % or more and 0.2 mass % or less of the powdered paint.

16. An electrostatic powder coating method comprising:
coating a first adherent layer by applying a first powdered paint onto a substrate, the first powdered paint comprising powdered particles having an attenuation factor $AF_{[30-300]}$ (%) represented by an absolute value of [(Q30-Q300)/Q30] is 30% or more and 60% or less, and an attenuation factor $AF_{[30-100]}$ (%) represented by an absolute value of [(Q30-Q100)/Q30] is 5% or more and 15% or less, wherein Q30 represents electric charge amount in an adherent layer including 100 g/m² of the powdered paint adhered to a substrate 30 seconds after forming the adherent layer, Q300 represents electric charge amount in the adherent layer 300 seconds after forming the adherent layer, and Q100 represents electric charge amount in the adherent layer 100 seconds after forming the adherent layer;
coating a second adherent layer by applying a second powdered paint onto the first adherent layer; and
baking the first adherent layer and the second adherent layer by heating, wherein
the first powdered paint comprises inorganic particles that have an aspect ratio of 3.3 or more and 5 or less.

17. The electrostatic powder coating method according to claim 16,
wherein the second adherent layer has an attenuation factor represented by an absolute value of (q30-q300)/q30 of 30% or more and 60% or less,
wherein q30 represents electric charge amount in the second adherent layer 30 seconds after forming the second adherent layer and q300 represents electric charge amount in the second adherent layer 300 seconds after forming the second adherent layer.

18. The electrostatic powder coating method according to claim 16,
wherein the second adherent layer has an attenuation factor represented by an absolute value of (q30-q300)/q30 of less than 30%,
wherein q30 represents electric charge amount in the second adherent layer 30 seconds after forming the second adherent layer and q300 represents electric charge amount in the second adherent layer 300 seconds after forming the second adherent layer.

* * * * *